United States Patent
Atarashi et al.

(10) Patent No.: US 6,994,652 B2
(45) Date of Patent: Feb. 7, 2006

(54) HYBRID TYPE VEHICLE DRIVE CONTROL DEVICE, HYBRID TYPE VEHICLE DRIVE CONTROL METHOD, AND PROGRAM THEREFOR

(75) Inventors: Tomoo Atarashi, Anjo (JP); Masaki Nomura, Anjo (JP); Kazuyuki Izawa, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 79 days.

(21) Appl. No.: 10/801,646

(22) Filed: Mar. 17, 2004

(65) Prior Publication Data

US 2004/0204291 A1    Oct. 14, 2004

(30) Foreign Application Priority Data

Apr. 11, 2003   (JP) .............................. 2003-108060

(51) Int. Cl.
*B60K 1/02*   (2006.01)
(52) U.S. Cl. ........................................................ 477/3
(58) Field of Classification Search .................... 477/3; 180/65.2; 303/152, 155
See application file for complete search history.

(56) References Cited

U.S. PATENT DOCUMENTS 5,823,281 A * 10/1998 Yamaguchi et al. ....... 180/65.2
6,883,626 B2 * 4/2005 Aoki et al. ................ 180/65.2

FOREIGN PATENT DOCUMENTS

JP    A 9-100853    4/1997

* cited by examiner

*Primary Examiner*—Dirk Wright
(74) *Attorney, Agent, or Firm*—Oliff & Berridge, PLC

(57) ABSTRACT

A hybrid type vehicle drive control device for preventing an engine from being stalled as a generator fixing mechanism is released. The hybrid type vehicle drive control device includes a generator connected differentially rotatably and mechanically to the engine, a generator fixing mechanism for mechanically stopping the rotation of the generator, a braking state decision device for deciding a braking state by a braking brake and a release control device for releasing the generator fixing mechanism when it is decided that an abrupt braking has been performed. When the abrupt braking is performed, the generator fixing mechanism can be released to prevent the engine speed from lowering and the engine from being stalled.

34 Claims, 28 Drawing Sheets

| TIME [ms] | OIL TEMPERATURE tmB [°C] | | | | | |
|---|---|---|---|---|---|---|
| | 0 | 10 | 40 | 80 | 100 | 200 |
| FIRST RELEASE TIME Tn1 | 150 | | | | | |
| SECOND RELEASE TIME Tn2 | 150 | 150 | 150 | 150 | 150 | 150 |
| THIRD RELEASE TIME Tn3 | 400 | 350 | 250 | 250 | 250 | 250 |
| FIRST QUASI-ABRUPT RELEASE TIME Tr1 | 50 | 50 | 50 | 50 | 50 | 50 |
| FIRST QUASI-ABRUPT RELEASE TIME Tr2 | 50 | 50 | 50 | 50 | 50 | 50 |
| FIRST QUASI-ABRUPT RELEASE TIME Tr3 | 100 | 100 | 100 | 100 | 100 | 100 |
| ABRUPT RELEASE TIME Tp | 0 | | | | | |

| OIL TEMPERATURE tmB [°C] | DRIVE MOTOR SPEED NM [rpm] | 3500 | 4200 | 4800 |
|---|---|---|---|---|
| 10 | ABRUPT RELEASE | 5000 | 6000 | 7000 |
| 10 | QUASI-ABRUPT RELEASE | 3500 | 4500 | 5500 |
| 40 | ABRUPT RELEASE | 5300 | 6300 | 7300 |
| 40 | QUASI-ABRUPT RELEASE | 3800 | 4800 | 5800 |
| 80 | ABRUPT RELEASE | 5600 | 6600 | 7600 |
| 80 | QUASI-ABRUPT RELEASE | 4100 | 5100 | 6100 |
| 100 | ABRUPT RELEASE | 5600 | 6600 | 7600 |
| 100 | QUASI-ABRUPT RELEASE | 4100 | 5100 | 6100 |

Fig. 37

HYBRID TYPE VEHICLE DRIVE CONTROL DEVICE, HYBRID TYPE VEHICLE DRIVE CONTROL METHOD, AND PROGRAM THEREFOR

BACKGROUND OF THE INVENTION

1. Field of Invention

The present invention relates to a hybrid type vehicle drive control device, a hybrid type vehicle drive control method, and a program therefor.

2. Description of Related Art

In the related art, there is a vehicle drive apparatus, which is mounted on a hybrid type vehicle and which transmits a portion of the torque of an engine, i.e., an engine torque, to a generator (or a generator motor) and the remainder to a drive wheel. This vehicle drive apparatus includes a planetary gear unit composed of a sun gear, a ring gear and a carrier, and generates a drive force by connecting (1) the carrier and the engine, (2) by connecting the ring gear, the drive motor and the drive wheel, and (3) by connecting the sun gear and the generator, thereby to transmit the rotations outputted from the ring gear and the drive motor to the drive wheel.

In the vehicle drive apparatus of this kind, in case the speed of the generator, i.e., the generator speed is low, the power consumption is increased which lowers the power efficiency of the generator and deteriorates the mileage of the hybrid type vehicle accordingly. In case the generator speed is low, therefore, a generator brake acting as a generator fixing mechanism is applied to stop the switching of the generator thereby to stop (or shut down) the generator. When a generator target speed indicating the target value of the generator speed exceeds a predetermined threshold value, the generator brake is released to drive the generator.

When the driver depresses the brake pedal while the hybrid type vehicle is driven with the generator brake being applied, on the other hand, the speed of the ring gear, i.e., the ring gear speed lowers as the vehicle speed lowers. At this time, however, a generator target speed is raised to correspond to the speed of the engine, i.e., the engine target speed indicating the target value of the engine speed and the ring gear speed, thereby to release the generator brake.

In order that the generator speed may not fluctuate according to the release of the generator brake, moreover, a generator torque, i.e., the torque of the generator, having the same magnitude as that of an engine torque to be transmitted to the generator is generated in the opposite direction to the engine torque (as referred to Patent Publication JP-A-9-100853).

SUMMARY OF THE INVENTION

In the vehicle drive apparatus of the related art thus far described, however, the vehicle speed abruptly lowers, if the driver depresses the brake pedal abruptly while the hybrid type vehicle is driven at a low speed with the generator brake being applied. At this time, the ring gear speed lowers with the generator brake being applied, so that the speed of the carrier accordingly lowers. Then, a torque is applied to stop the engine connected to the carrier, and the engine may be stalled ("en-st").

FIG. 2 is a time chart showing the actions of the vehicle drive apparatus when an abrupt braking is performed in the hybrid type vehicle of the related art.

In FIG. 2: letters NE designate the speed of the engine, i.e., the engine speed; letter V designates a vehicle speed; letters NG designate a generator speed; and letters Pb designate the pressure of the hydraulic servo of the generator brake, i.e., a brake pressure.

When the driver depresses the brake pedal abruptly at a time t1 for the abrupt braking, the engine speed NE and the vehicle speed V abruptly lower. At a timing t2, a brake-OFF is judged for releasing the generator brake, and then the brake solenoid is actually turned from ON to OFF at a timing t3. As a result, the brake pressure Pb does not begin to lower until the time t3, and the release of the generator brake is delayed so that the generator speed NG does not rise. Therefore, the engine speed NE continues to lower so that the engine is stalled.

In accordance with this stall, moreover, not only the engine speed NE, but also the engine torque to be transmitted to the planetary gear unit, fluctuate seriously. As a result, vibrations are transmitted to the engine, the planetary gear unit, and so on, thereby degrading the durability of the vehicle drive apparatus.

The present invention addresses the aforementioned problems of the vehicle drive apparatus of the related art and provides: a hybrid type vehicle drive control device for preventing an engine from being stalled as a generator fixing mechanism is released; a hybrid type vehicle drive control method; and a program therefor.

According to one aspect of the invention, therefore, there is provided a hybrid type vehicle drive control device comprising: a generator connected differentially rotatably and mechanically to an engine; a generator fixing mechanism for stopping the rotation of the generator mechanically; braking state decision means for deciding a braking state by a braking brake; and release control means for releasing the generator fixing mechanism when it is decided that an abrupt braking has been performed.

According to another aspect of the invention, there is provided a hybrid type vehicle drive control device comprising: a generator connected differentially rotatably and mechanically to an engine; a generator fixing mechanism for stopping the rotation of the generator mechanically; braking state decision means for deciding a braking state by a braking brake; and release control means for releasing the generator fixing mechanism in a mode set to correspond to a deceleration, when it is decided that an abrupt braking has been performed.

According to one aspect of the invention, there is provided a hybrid type vehicle drive control method, wherein the braking state by a braking brake is decided by mechanically stopping the rotation of a generator connected differentially rotatably and mechanically to an engine, and wherein a generator fixing mechanism is released when it is decided that an abrupt braking has been performed.

According to another aspect of the invention, there is provided a hybrid type vehicle drive control method, wherein the braking state by a braking brake is decided by mechanically stopping the rotation of a generator connected differentially rotatably and mechanically to an engine, and wherein a generator fixing mechanism is released in a mode set to correspond to a deceleration, when it is decided that an abrupt braking has been performed.

According to one aspect of the invention, there is provided a program for a hybrid type vehicle drive control method, wherein a computer functions as a braking state decision means for deciding a braking state by a braking brake, and a release control means for releasing a generator fixing mechanism when it is decided that an abrupt braking has been performed.

According to another aspect of the invention, there is provided a program for a hybrid type vehicle drive control method, wherein a computer functions as a braking state decision means for deciding a braking state by a braking brake, and a release control means for releasing a generator fixing mechanism in a mode set to correspond to a deceleration, when it is decided that an abrupt braking has been performed.

BRIEF DESCRIPTION OF THE DRAWINGS

FIG. 37 is a diagram showing a release control limit map in the second embodiment of the invention.

DETAILED DESCRIPTION OF PREFERRED EMBODIMENTS

Exemplary embodiments of the invention will be described in detail with reference to the accompanying drawings.

Figure 1:
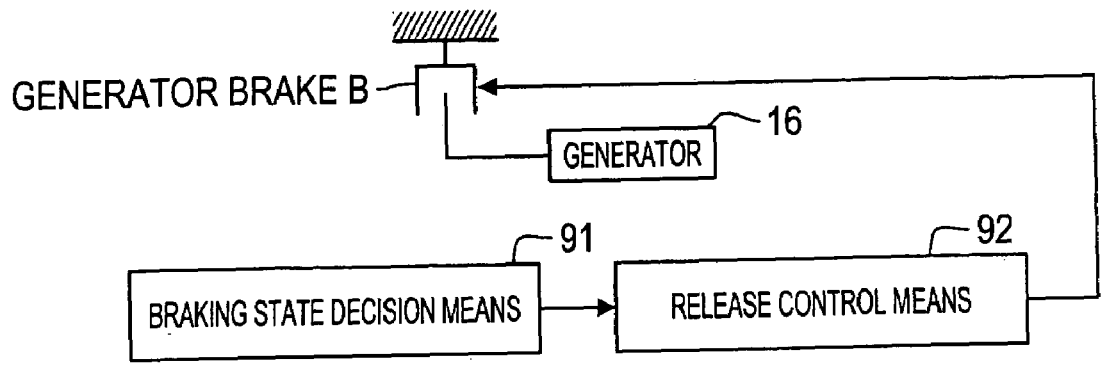
FIG. 1 is a functional block diagram of a hybrid type vehicle drive control device, according to a first exemplary embodiment of the invention.
Figure 2:
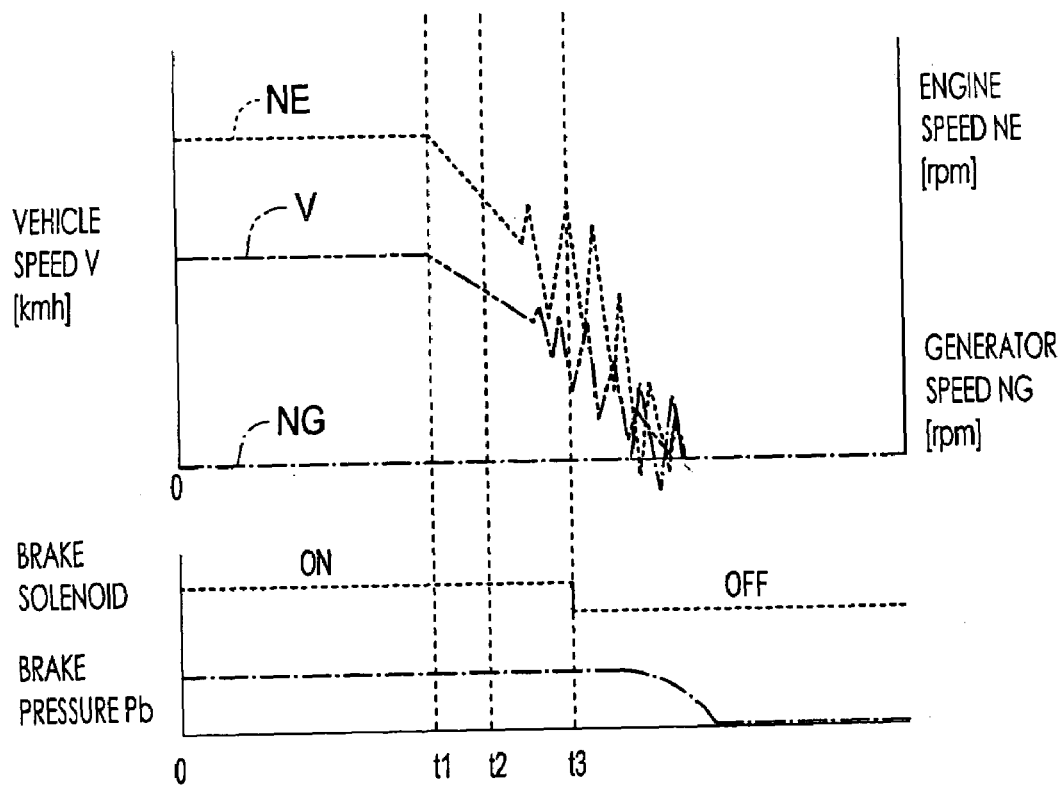
FIG. 2 is a time chart showing the actions of the vehicle drive apparatus when any abrupt braking is performed in the hybrid type vehicle of the related art.

FIG. 1 is a functional block diagram of a hybrid type vehicle drive control device, according to a first embodiment of the invention. In FIG. 1, a generator 16 is connected differentially rotatably and mechanically to the engine (not-shown). A generator brake B acts as a generator-fixed mechanism to stop the rotation of the generator 16 mechanically. A braking state decision means 91 decides a braked state created by the brake (not-shown). A release control means 92 releases the generator brake B when an abrupt braking occurs.

Figure 3:
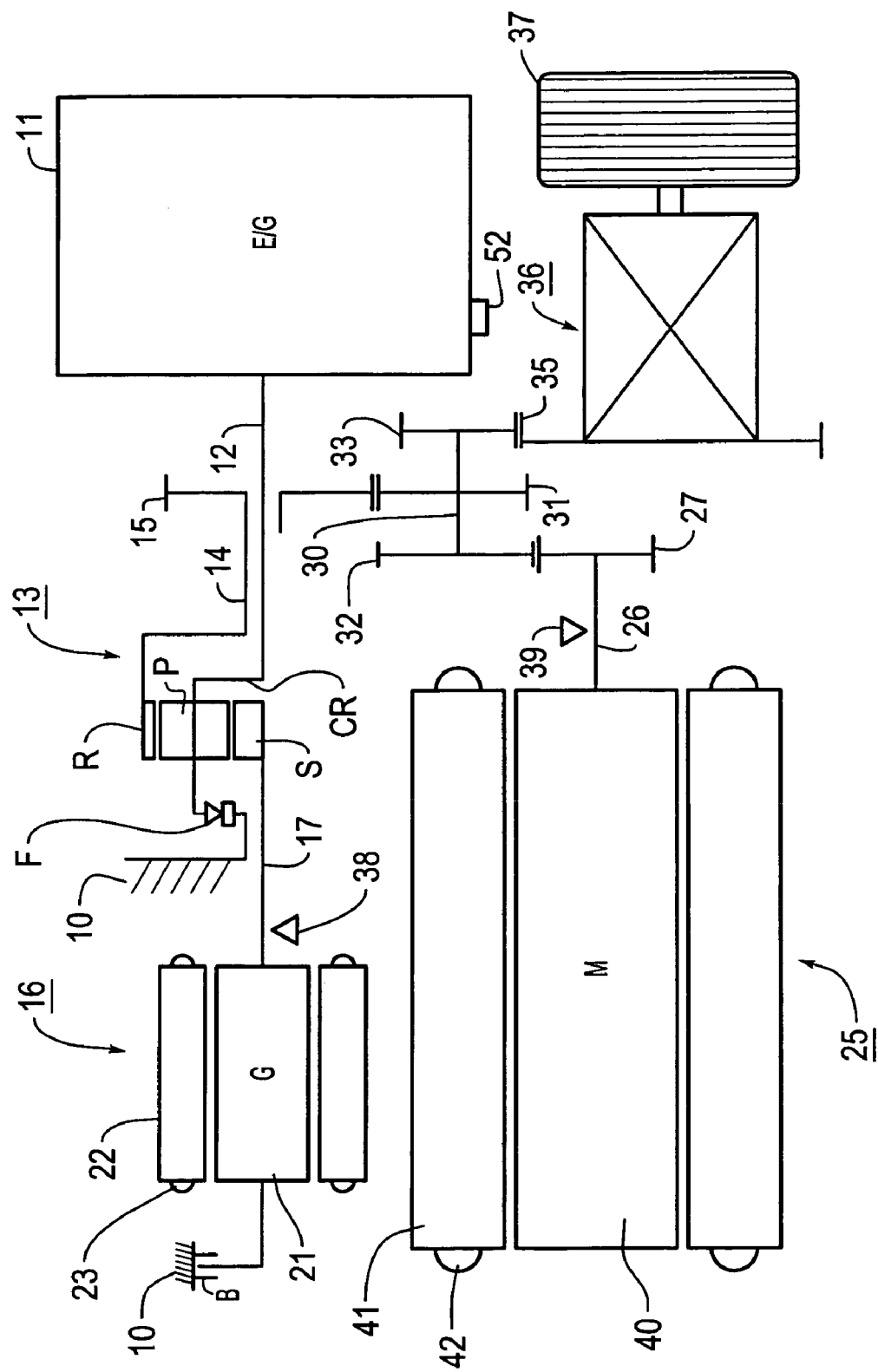
FIG. 3 is a diagram of a hybrid type vehicle, according to the first embodiment of the invention.

FIG. 3 is a diagram of a hybrid type vehicle according to the first exemplary embodiment of the invention. In FIG. 3, an engine 11 (E/G) acts as a power machine arranged on a first axis. An output shaft 12 outputs the rotation generated by driving the engine 11. A planetary gear 13, is arranged on the first axis to act as a speed change mechanism and a differential gear mechanism thereby to change the speed of the rotation inputted through the output shaft 12. An output shaft 14, is arranged on the first axis to output the speed-changed rotation of the planetary gear unit 13. A first counter drive gear 15, acts as an output gear fixed on the output shaft 14. A generator 16 (G) acts as a first electric machine, which is arranged on the first axis and connected through a transmission shaft 17 to the planetary gear unit 13 and which is connected differentially rotatably and mechanically to the engine 11.

The output shaft 14 has a sleeve shape and is arranged around the output shaft 12. The first counter drive gear 15 is arranged on the side of the engine 11 with respect to the planetary gear unit 13.

The planetary gear unit 13 is provided at least with a sun gear S or a first gear element, a pinion P to mesh with the sun gear S, a ring gear R acting as a second gear element to mesh with the pinion P, and a carrier CR acting as a third gear element to support the pinion P rotatably. The sun gear S is connected through the transmission shaft 17 to the generator 16. The ring gear R is connected through the output shaft 14 and a predetermined gear train to a drive motor (M) 25, which acts as a second electric machine arranged on a second axis parallel to the first axis and connected differentially rotatably and mechanically to the engine 11 and the generator 16, and to a drive wheel 37. The carrier CR is connected through the output shaft 12 to the engine 11. The drive motor 25 and the drive wheel 37 are mechanically connected to each other. Between the carrier CR and the case 10 of the hybrid type vehicle drive apparatus acting as a vehicle drive apparatus, on the other hand, there is arranged a one-way clutch F, which is set free when a forward rotation is transmitted from the engine 11 to the carrier CR, and is locked when a backward rotation is transmitted from the generator 16 or the drive motor 25 to the carrier CR, thereby to prevent the backward rotation from being transmitted to the engine 11.

The generator 16 is composed of: a rotor 21 fixed on the transmission shaft 17 and arranged rotatably; a stator 22 arranged around the rotor 21; and a coil 23 wound on the stator 22. The generator 16 generates electric power by the rotation transmitted through the transmission shaft 17. The coil 23 is connected with the battery (not-shown) to feed the battery with a DC current. Between the rotor 21 and the case 10, there is arranged the generator brake B, which acts as a generator fixing mechanism. When this generator brake B is applied, the rotor 21 can be fixed to stop the rotation of the generator 16 mechanically. For this stopping operation, the generator brake B is provided with the thin sheets (not-shown) on the drive side and on the driven side, a hydraulic servo, and the like. When an oil pressure is fed to the hydraulic servo, the thin sheets are pushed to each other so that the generator brake B is applied by the frictional force.

Moreover, an output shaft 26, is arranged on the second axis for outputting the rotation of the drive motor 25. A second counter drive gear 27 acts as an output gear, which is fixed on the output shaft 26. The drive motor 25 is composed of a rotor 40 fixed on the output shaft 26 and arranged rotatably, a stator 41 arranged around the rotor 40, and a coil 42 wound on the stator 41.

The drive motor 25 generates torque, i.e., a drive motor torque TM, with the electric currents of U-phase, V-phase and W-phase, i.e., AC currents to be fed to the coil 42. For this generation, the coil 42 is connected with the battery so that the DC current from the battery is converted into the electric currents of the individual phases and fed to the coil 42.

In order to rotate the drive wheel 37 in the same direction as that of the engine 11, a counter shaft 30 is arranged on a third axis parallel to the first and second axes. On the counter shaft 30, there are fixed a first counter driven gear 31 and a second counter driven gear 32 having a larger tooth number than that of the first counter driven gear 31. The first counter driven gear 31 meshes with the first counter drive gear 15, and the second counter driven gear 32 meshes with the second counter drive gear 27. As a result, the rotation of the first counter drive gear 15 is reversed and transmitted to the first counter driven gear 31, and the rotation of the second drive gear 27 is reversed and transmitted to the second counter driven gear 32.

On the counter shaft 30, moreover, there is fixed a differential pinion gear 33, which has a smaller tooth number than that of the first counter driven gear 31.

On a fourth axis parallel to those first to third axes, there is arranged a differential device 36, which has a differential ring gear 35 meshing with the differential pinion gear 33. Therefore, the rotation transmitted to the differential ring gear 35 is distributed by the differential device 36 and is transmitted to the drive wheel 37. Thus, not only the rotation generated by the engine 11 can be transmitted to the first counter driven gear 31, but also the rotation generated by the drive motor 25 can be transmitted to the second counter driven gear 32. As a result, the hybrid type vehicle can be driven by running the engine 11 and the drive motor 25.

Moreover, a generator rotor position sensor 38, such as a resolver, detects the position of the rotor 21, i.e., a generator rotor position θG. A drive motor rotor position sensor 39, such as a resolver, detects the position of the rotor 40, i.e., a drive motor rotor position θM. An engine speed sensor 52, acts as an engine speed detection unit for detecting an engine speed NE. The generator rotor position θG detected is sent to the vehicle controller (not-shown) and the generator controller (not-shown), and the drive motor rotor position θM detected is sent to the vehicle controller and the drive motor controller (not-shown).

Figure 4:
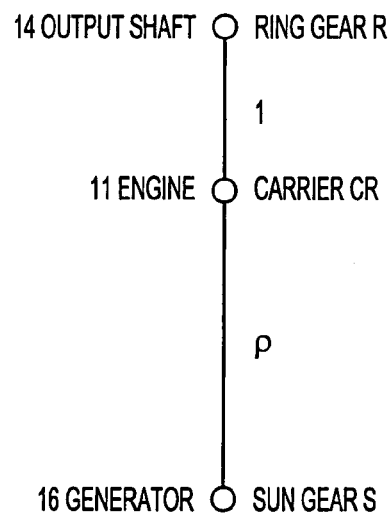
FIG. 4 is an explanatory diagram of the actions of a planetary gear unit in the first embodiment of the invention.
Figure 5:
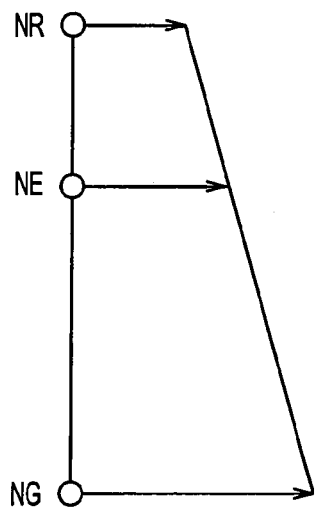
FIG. 5 is a velocity diagram at an ordinary running time in the first embodiment of the invention.
Figure 6:
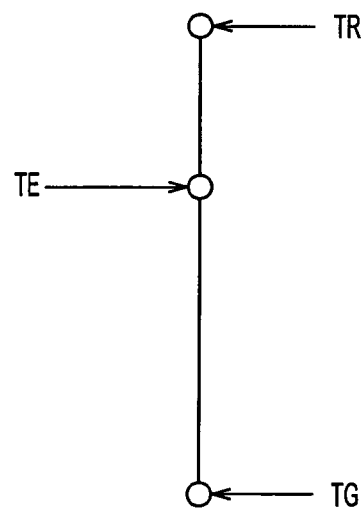
FIG. 6 is a torque diagram at the ordinary running time in the first embodiment of the invention.

FIG. 4 is an explanatory diagram of the actions of the planetary gear unit in the first embodiment of the invention; FIG. 5 is a velocity diagram at an ordinary running time in the first embodiment of the invention; and FIG. 6 is a torque diagram at the ordinary running time in the first embodiment of the invention.

In the planetary gear unit 13 (FIG. 3) the carrier CR is connected to the engine 11, the sun gear S is connected to the generator 16, and the ring gear R is connected through the output shaft 14 to the drive motor 25 and the drive wheel 37. Therefore a ring gear speed NR is equal to the speed outputted to the output shaft 14, i.e., the output shaft speed, the speed of the carrier CR is equal to the engine speed NE, and the speed of the sun gear S is equal to a generator speed NG. If the ring gear R has a tooth number ρ times (e.g., two times in this embodiment) as large as that of the sun gear S, the following relation holds:

$$(\rho+1)\cdot NE = 1\cdot NG + \rho\cdot NR.$$

On the basis of the ring gear speed NR and the generator speed NG, therefore, the engine speed NE can be calculated, as follows:

$$NE = (1\cdot NG + \rho\cdot NR)/(\rho+1) \quad (1).$$

Moreover, the speed relation of the planetary gear unit 13 can be deduced from the formula (1).

On the other hand, an engine torque TE, a torque generated at the ring gear R, i.e., a ring gear torque TR, and an electric machine torque or a generator torque TG have the following relation:

$$TE:TR:TG = (\rho+1):\rho:1 \quad (2),$$

so that they receive reaction forces from each other. Moreover, the torque relation of the planetary gear unit 13 can be deduced from the formula (2).

At the ordinary running time of the hybrid type vehicle, moreover, the ring gear R, the carrier CR and the sun gear S are all turned in the positive direction so that all the ring gear speed NR, the engine speed NE and the generator speed NG take positive values, as shown in FIG. 5. The ring gear torque TR and the generator torque TG can be obtained by dividing the engine torque TE in proportion at a torque ratio determined by the tooth number of the planetary gear unit 13. In the torque diagram shown in FIG. 6, therefore, the sum of the ring gear torque TR and the generator torque TG is the engine torque TE.

Figure 7:
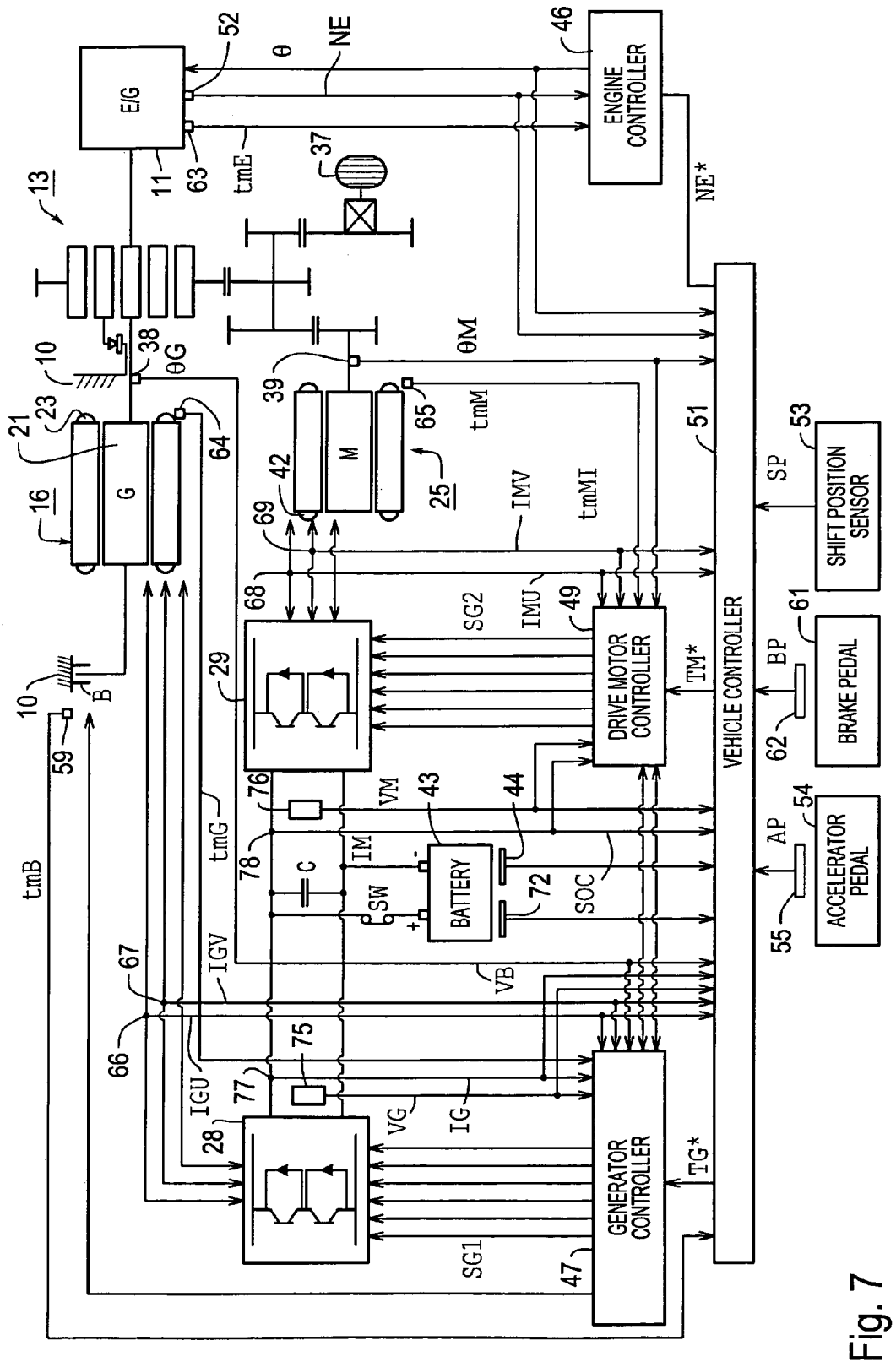
FIG. 7 is a diagram of the hybrid type vehicle drive control device, according to the first embodiment of the invention.

FIG. 7 is a diagram of the hybrid type vehicle drive control device according to the first embodiment of the invention. In FIG. 7, the case 10, the engine (E/G) 11, the planetary gear unit 13, and the generator 16 (G) are shown. The generator brake B fixes the rotor 21 of the generator 16. An inverter 28 acts as a generator inverter for driving the generator 16. An inverter 29 acts as a drive motor inverter for driving the drive motor 25 (M). The drive wheel 37, the generator rotor position sensor 38, the drive motor rotor position sensor 39, and a battery 43, are also shown. The inverters 28 and 29 are connected through a power switch Sw with the battery 43 so that the battery 43 feeds the inverters 28 and 29 with the DC current when the power switch Sw is ON.

On the entrance side of the inverter 28, there are arranged, a generator inverter voltage sensor 75 acting as a first DC voltage detector for detecting a DC voltage to be applied to the inverter 28, i.e., a generator inverter voltage VG, and a generator inverter current sensor 77 acting as a first DC current detector for detecting a DC current to be fed to the inverter 28, i.e., a generator inverter current IG. On the entrance side of the inverter 29, on the other hand, there are arranged, a drive motor inverter voltage sensor 76 acting as a second DC voltage detector for detecting a DC voltage to be fed to the inverter 29, i.e., a drive motor inverter voltage VM, and a drive motor inverter current sensor 78 acting as a second DC current detector for detecting a DC current to be fed to the inverter 29, i.e., a drive motor inverter current IM. The generator inverter voltage VG and the generator inverter current IG are sent to a generator controller 47 and a vehicle controller 51, and the drive motor inverter voltage VM and the drive motor inverter current IM are sent to the drive motor controller 49 and the vehicle controller 51. A smoothing capacitor C is connected between the battery 43 and the inverters 28 and 29.

Moreover, the vehicle controller 51 is composed of the CPU, the recorder and the like (not shown) to control the hybrid type vehicle drive apparatus as a whole, and functions as a computer on the various of various programs, data and the like. The vehicle controller 51 is connected with an engine controller 46, the generator controller 47 and a drive motor controller 49. The engine controller 46 is composed of the CPU, the recorder and the like (not shown) and sends instruction signals on a throttle opening θ, a valve timing and the like, so as to control the engine 11. The generator controller 47 is composed of the CPU, the recorder and the like (not shown) and sends a drive signal SG1 to the inverter 28 so as to control the generator 16. The generator controller 49 is composed of the CPU, the recorder and the like (not shown) and sends a drive signal SG2 to the inverter 29 so as to control the drive motor 25. Here, the engine controller 46, the generator controller 47 and the drive motor controller 49 construct a first controller positioned in a lower order than that of the vehicle controller 51, and this vehicle controller 51 constructs a second controller positioned in a higher order than those of the engine controller 46, the generator controller 47 and the drive motor controller 49. Moreover, the engine controller 46, generator controller 47 and drive motor controller 49 also function as computers on the basis of various programs, data and the like.

The inverter 28 is driven in response to the drive signal SG1. At a power running time, the inverter 28 receives the DC current from the battery 43 to generate currents IGU, IGV and IGW of the individual phases and feed them to the generator 16. At a regenerative time, the inverter 28 receives the currents IGU, IGV and IGW of the individual phases from the generator 16 to generate a DC current and feed it to the battery 43.

The inverter 29 is driven in response to the drive signal SG2. At the power running time, the inverter 29 receives the DC current from the battery 43 to generate currents IMU, IMV and IMW of the individual phases and feed them to the drive motor 25. At the regenerative time, the inverter 29 receives the currents IMU, IMV and IMW of the individual phases from the drive motor 25 to generate a DC current and feed it to the battery 43.

Moreover, a battery residue detector 44 detects the state of the battery 43, i.e., a battery residue SOC as the battery state. The numeral 52 designates the engine speed sensor. A shift position sensor 53 detects the position of the shift lever (not-shown) acting as speed change means, i.e., a shift position SP. An accelerator switch 55 acts as an acceleration detector for detecting the position (or depression) of an accelerator pedal 54, i.e., an accelerator pedal position AP. An oil temperature sensor 59 acts as an oil temperature detector for detecting the temperature of the oil in the hydraulic servo of the generator brake B, i.e., an oil temperature tmB. A brake pedal 61 activates the brake (not-shown). A brake switch 62 acts as a braking detector for detecting the position (or depression) of the brake pedal 61, i.e., a brake pedal position BP. An engine temperature sensor 63 detects the temperature tmE of the engine 11. A generator temperature sensor 64 detects the temperature of the generator 16, such as the temperature tmG of the coil 23. A drive motor temperature sensor 65 detects the temperature of the drive motor 25, e.g., the temperature tmM of the coil 42.

Moreover, current sensors 66–69 detect the currents IGU, IGV, IMU and IMV of the individual phases, respectively. A battery voltage sensor 72 acts as a voltage detector for the battery 43, to detect a battery voltage VB as the battery state. The battery voltage VB and the battery residue SOC are sent to the generator controller 47, the drive motor controller 49 and the vehicle controller 51. The battery current, the battery temperature, and the like, could also be detected as the battery state. Here, the battery residue detector 44, the battery voltage sensor 72, the battery current sensor (not-shown), the battery temperature sensor (not-shown) and the like construct a battery state detector. Moreover, the detected currents IGU and IGV are sent to the generator controller 47 and the vehicle controller 51, and the currents IMU and IMV are sent to the drive motor controller 49 and the vehicle controller 51.

The vehicle controller 51 sends an engine control signal to the engine controller 46, by which the run/stop of the engine 11 is set. On the other hand, the vehicle speed calculation means (not-shown) of the vehicle controller 51 performs the vehicle speed calculation to calculate the rate of change ΔθM of the drive motor rotor position θM thereby to calculate a vehicle speed V on the basis of the rate of change ΔθM and a gear ratio γV in the torque transmission line from the output shaft (FIG. 3) to the drive wheel 37.

The vehicle controller 51 determines an engine target speed NE* indicating the target value of the engine speed NE, a generator target torque TG* indicating the target value of the generator torque TG and a drive motor target torque TM* indicating the target value of the drive motor torque TM, and sends the target torques to the engine controller 46, the generator controller 47 and the drive motor controller 49, respectively. The generator controller 47 sets a generator target speed NG* indicating the target value of the generator speed NG* and the drive motor controller 49 sets a corrected drive motor torque value δTM indicating the corrected value of the drive motor torque TM. Here, the engine target speed NE*, the generator target torque TG*, the drive motor target torque TM* and so on construct a control command value.

On the other hand, the generator speed calculation means (not-shown) of the generator controller 47 performs a generator speed calculation to calculate the generator speed NG by reading the generator rotor position θG and by calculating the rate of change ΔθG of the generator rotor position θG.

Moreover, the drive motor speed calculation means (not-shown) of the drive motor controller 49 performs a drive motor speed calculation to calculate the speed of the drive motor 25, i.e., a drive motor speed NM by reading the drive motor rotor position θM and by calculating the rate of change ΔθM of the drive motor rotor position θM.

Here, the generator rotor position θG and the generator speed NG are proportional to each other, and the drive motor rotor position θM, the drive motor speed NM and the vehicle speed V are proportional to one another. Therefore, the generator rotor position sensor 38 and the generator speed calculation means could also function as a speed detector for detecting the generator speed NG, the drive motor rotor position sensor 39 and the drive motor speed calculation means could also function as a speed detector for detecting the drive motor speed NM, and the drive motor rotor position sensor 39 and the vehicle speed calculation means could also function as a vehicle speed detector for detecting the vehicle speed V.

In this exemplary embodiment, the engine speed NE is detected by the engine speed sensor 52, but could also be calculated by the engine controller 46. In this embodiment, moreover, the vehicle speed V is calculated by the vehicle speed calculation means on the basis of the drive motor rotor position θM. However, the vehicle speed V could also be calculated on the basis of the ring gear speed NR by detecting the ring gear speed NR, or on the basis of the speed of the drive wheel 37, i.e., the drive wheel speed. In this modification, the ring gear speed sensor, the drive wheel speed sensor and the like are arranged as the vehicle speed detector.

The actions of the hybrid type vehicle drive control device thus constructed will be described in the following.

Figure 8:
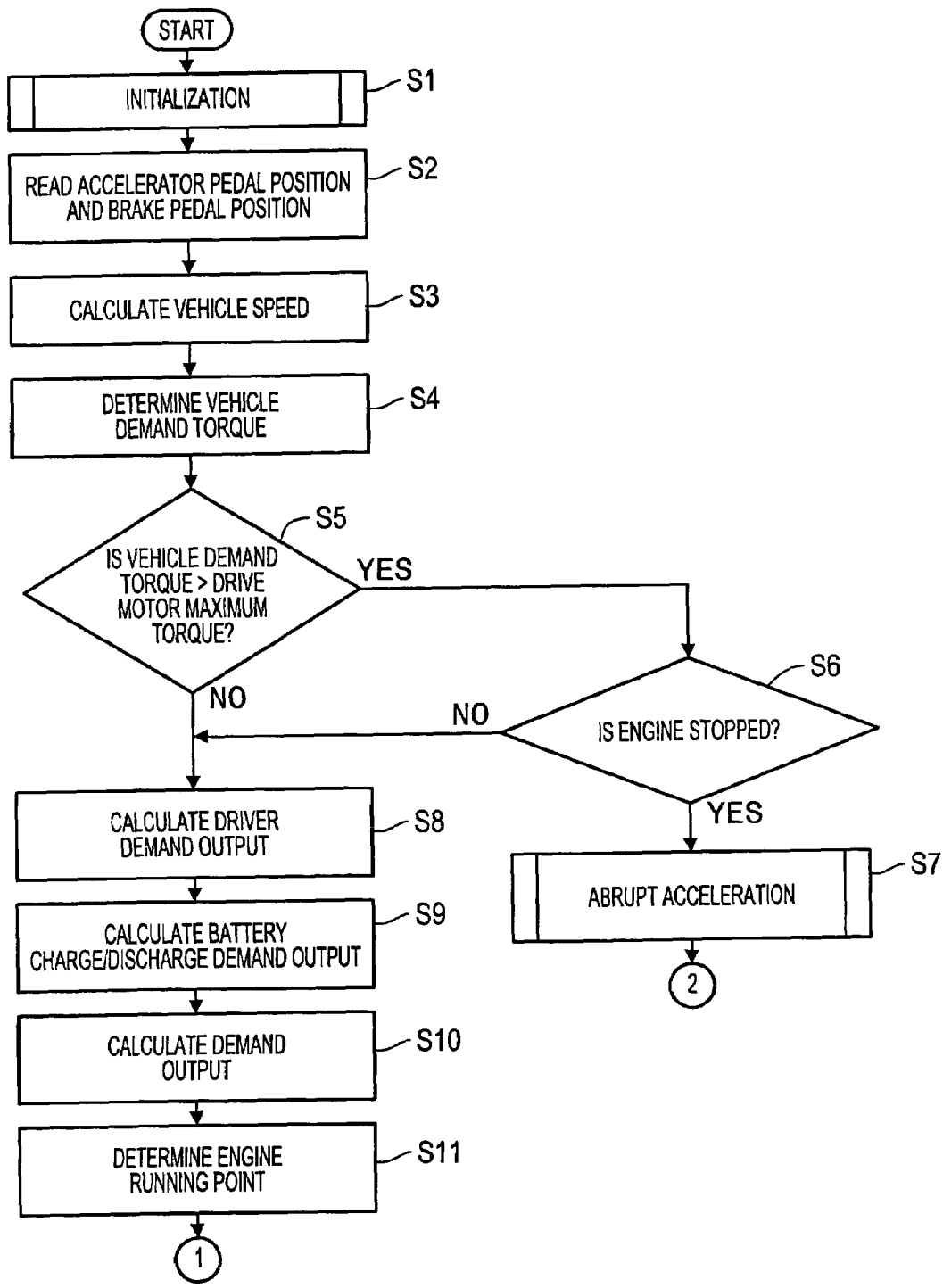
FIG. 8 is a first main flow chart showing the actions of the hybrid type vehicle drive control device, according to the first embodiment of the invention.
Figure 9:
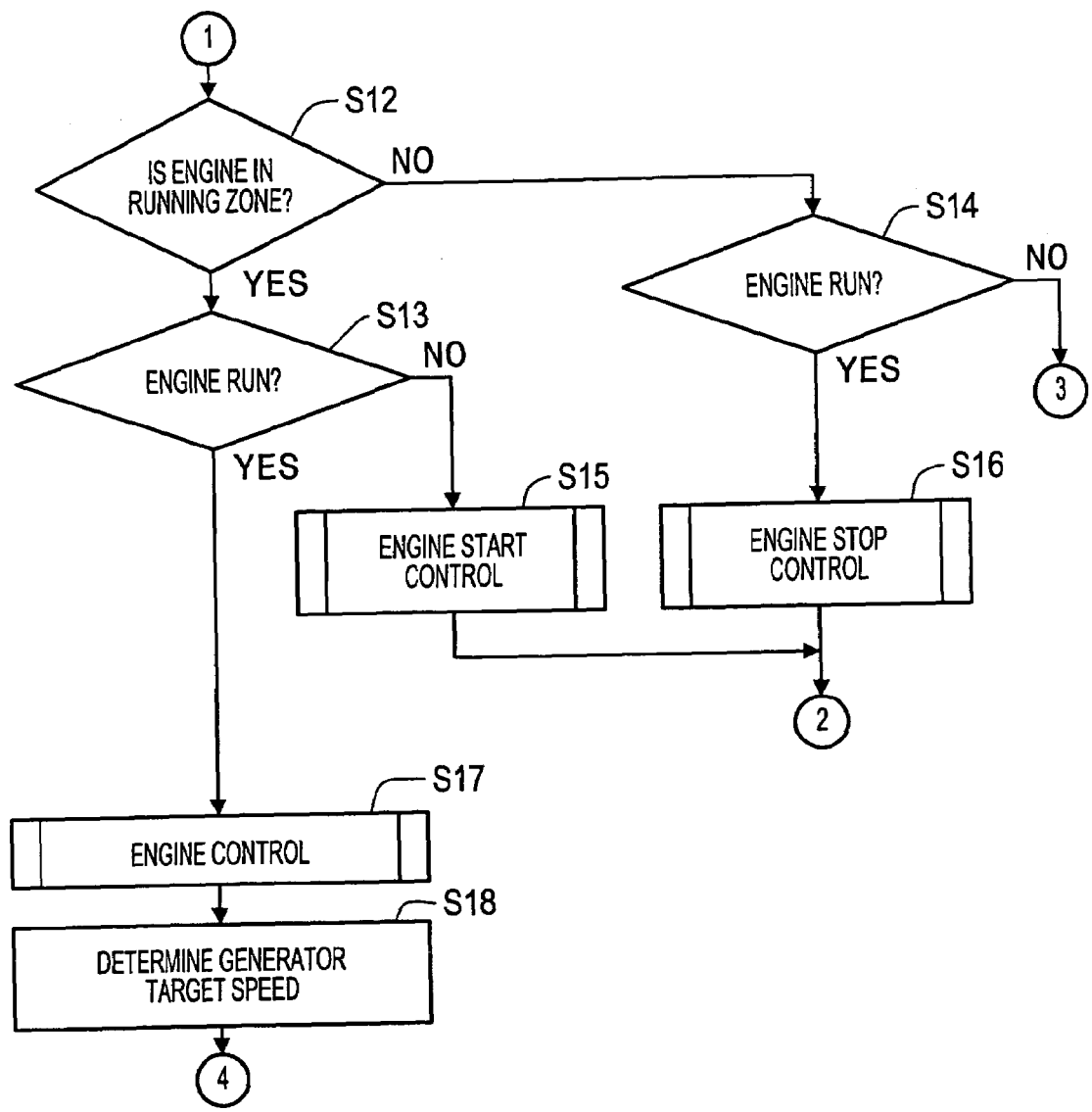
FIG. 9 is a second main flow chart showing the actions of the hybrid type vehicle drive control device, according to the first embodiment of the invention.
Figure 10:
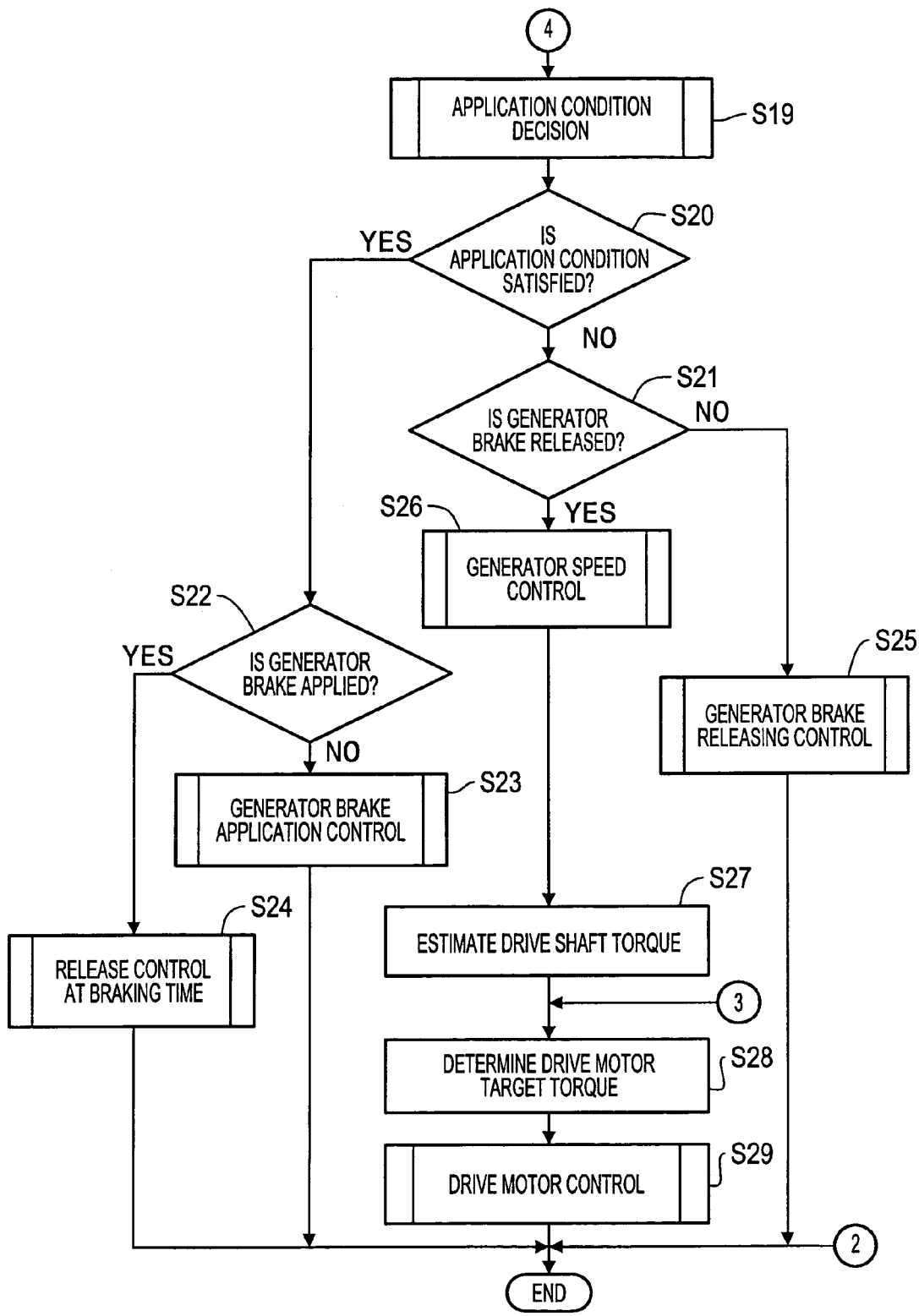
FIG. 10 is a third main flow chart showing the actions of the hybrid type vehicle drive control device, according to the first embodiment of the invention.
Figure 11:
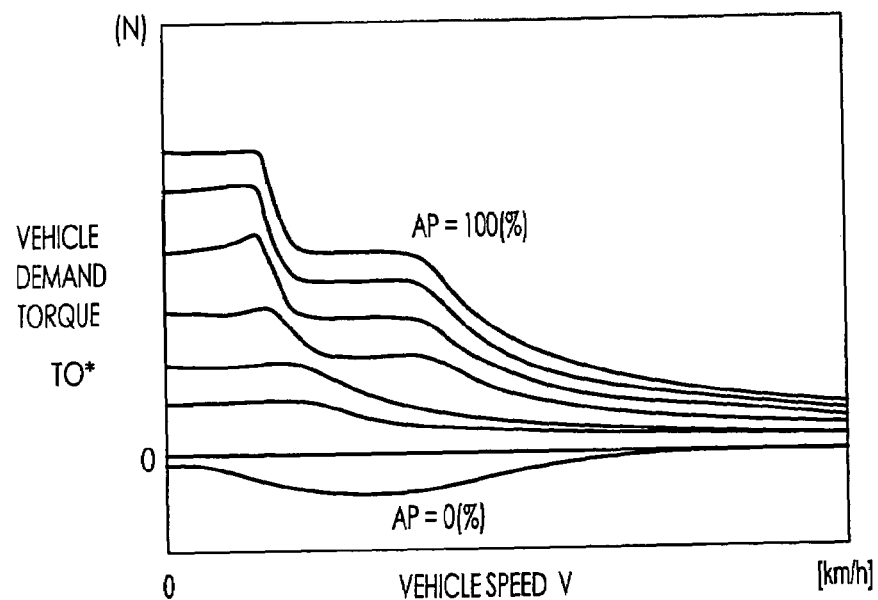
FIG. 11 is a diagram showing a first vehicle demand torque map in the first embodiment of the invention.
Figure 12:
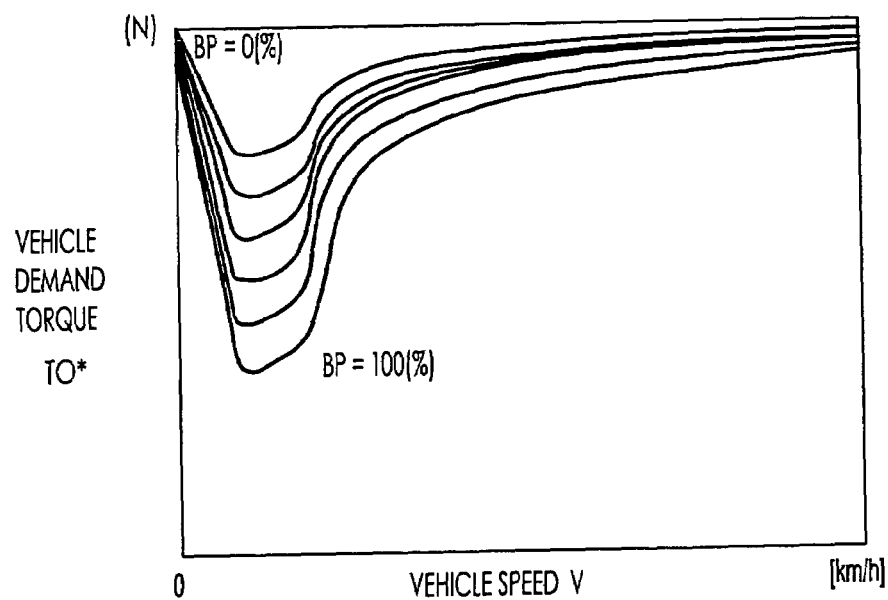
FIG. 12 is a diagram showing a second vehicle demand torque map in the first embodiment of the invention.
Figure 13:
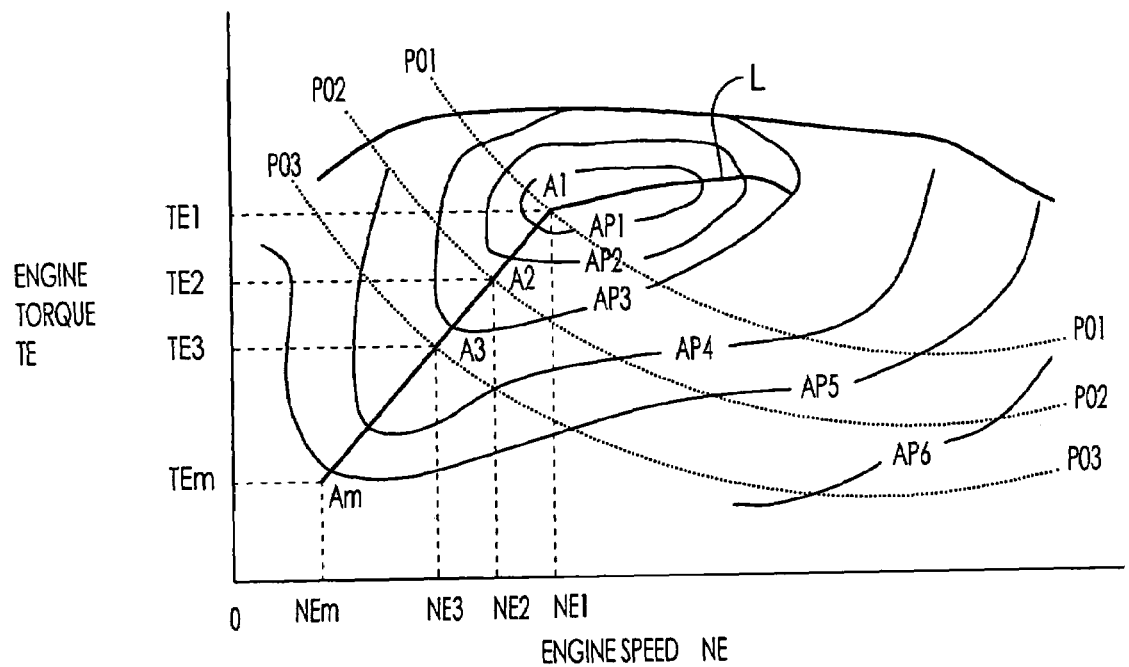
FIG. 13 is a diagram showing an engine target running state map in the first embodiment of the invention.
Figure 14:
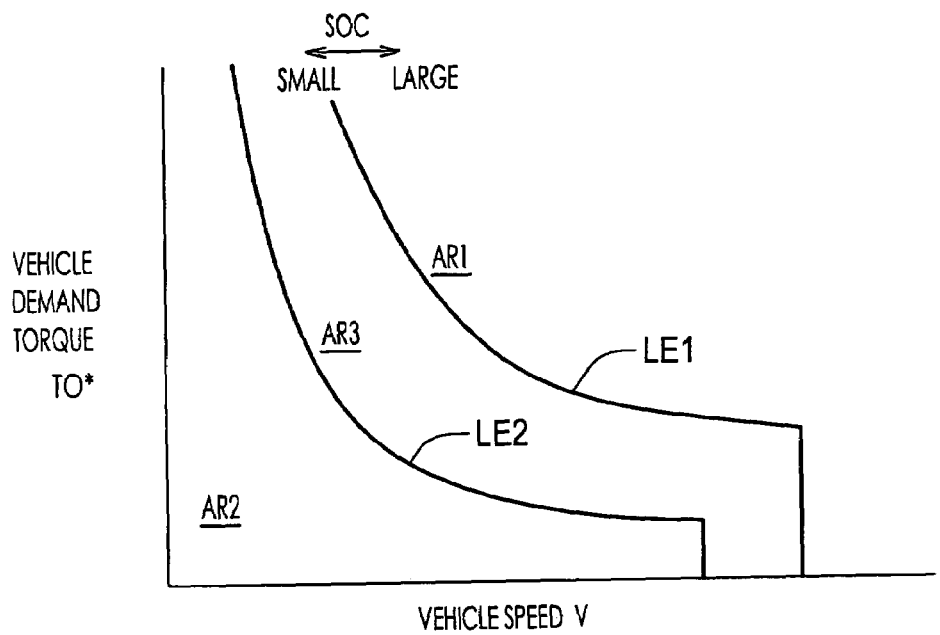
FIG. 14 is a diagram showing an engine drive zone map in the first embodiment of the invention.
Figure 15:
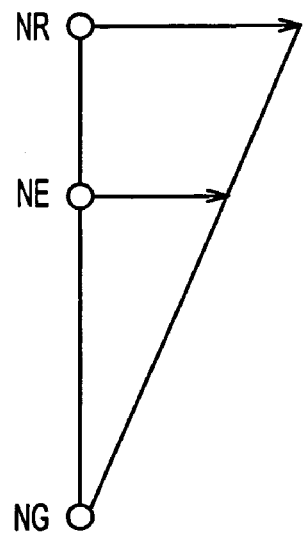
FIG. 15 is a velocity diagram in the first embodiment of the invention when a generator brake is applied.
Figure 16:
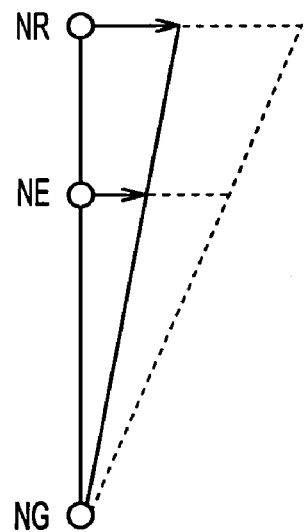
FIG. 16 is a velocity diagram when the vehicle speed abruptly lowers.

FIG. 8 is a first main flow chart showing the actions of the hybrid type vehicle drive control device according to the first embodiment of the invention; FIG. 9 is a second main flow chart showing the actions of the hybrid type vehicle drive control device according to the first embodiment of the invention; FIG. 10 is a third main flow chart showing the actions of the hybrid type vehicle drive control device according to the first embodiment of the invention; FIG. 11 is a diagram showing a first vehicle demand torque map in the first embodiment of the invention; FIG. 12 is a diagram showing a second vehicle demand torque map in the first embodiment of the invention; FIG. 13 is a diagram showing an engine target running state map in the first embodiment of the invention; FIG. 14 is a diagram showing an engine drive zone map in the first embodiment of the invention; FIG. 15 is a velocity diagram in the first embodiment of the invention when a generator brake is applied; and FIG. 16 is a velocity diagram when the vehicle speed abruptly lowers. In FIGS. 11, 12 and 14, the vehicle speed V is taken on the abscissa, and a vehicle demand torque TO* is taken on the ordinate. In FIG. 13, the engine speed NE is taken on the abscissa, and the engine torque TE is taken on the ordinate.

At first, the initialization means (not-shown) of the vehicle controller 51 (FIG. 7) performs an initialization to set the various variables to initial values. Next, the vehicle controller 51 reads the accelerator position AP from the accelerator switch 55 and the brake pedal position BP from the brake switch 62. The vehicle speed calculation means calculates the vehicle speed V on the basis of the rate of change ΔθM and the gear ratio γV by reading the drive motor rotor position θM to calculate the rate of change ΔθM of the drive motor rotor position θM.

Subsequently, the vehicle demand torque determination means (not-shown) of the vehicle controller 51 performs a vehicle demand torque determination. The vehicle controller 51 determines that vehicle demand torque TO* necessary for driving the hybrid type vehicle, which has been preset to correspond to the vehicle speed V and the accelerator pedal position AP or the brake pedal position BP, with reference to a first vehicle demand map of FIG. 11, which is recorded in the recorder of the vehicle controller 51, in case the accelerator pedal 54 is depressed, and with reference to a second vehicle demand torque map of FIG. 12 recorded in that recorder, in case the brake pedal 61 is depressed.

Subsequently, the vehicle controller 51 judges whether or not the vehicle demand torque TO* is higher than a drive motor maximum torque TMmax, which has been preset as the rating of the drive motor 25. In case the vehicle demand torque TO* is higher than the drive motor maximum torque TMmax, the vehicle controller 51 judges whether or not the engine 11 is being stopped. In case the engine 11 is stopped, the abrupt acceleration control means (not-shown) of the vehicle controller 51 performs an abrupt acceleration control to drive the hybrid type vehicle by running the drive motor 25 and the generator 16.

In case the vehicle demand torque TO* is the drive motor maximum torque TMmax or less, and in case the vehicle demand torque TO* is higher than the drive motor maximum torque TMmax and in case the engine 11 is being run, the driver demand output calculation means (not-shown) of the vehicle controller 51 performs a driver demand output calculation to calculate a driver demand output PD by multiplying the vehicle demand torque TO* and the vehicle speed V:

$$PD=TO^* \cdot V.$$

Next, the battery charge/discharge demand output calculation means (not-shown) of the vehicle controller 51 performs a battery charge/discharge demand output calculation to calculate a battery charge/discharge demand output PB on the basis of the battery residue SOC by reading the battery residue SOC from the battery residue detector 44.

Subsequently, the vehicle demand output calculation means (not-shown) of the vehicle controller 51 performs a vehicle demand output calculation to calculate a vehicle demand output PO by adding the driver demand output PD and the battery charge/discharge demand output PB:

$$PO=PD+PB.$$

Next, the engine target running state setting means (not-shown) of the vehicle controller 51 performs an engine target running state setting. This setting means refers to an engine target running state map of FIG. 13, which is recorded in the recorder of the vehicle controller 51, to determine: points A1 to A3 and Am, at which curves PO1, PO2, . . . , and so on indicating the vehicle demand output PO and an optimum mileage curve L indicating the highest efficiency of the engine 11 at the individual accelerator pedal positions AP1 to AP6 intersect, as the running point of the engine 11 in the engine target running state; engine torques TE1 to TE3 and TEm at that running point, as the engine target torque TE* indicating the target value of the engine torque TE; and the engine speeds NE1 to NE3 and NEm at that running point, as the engine target speed NE*; and sends this engine target speed NE* to the engine controller 46.

Then, this engine controller 46 judges whether or not the engine 11 is placed in a running zone AR1, with reference to an engine running zone map of FIG. 14, which is recorded in the recorder of the engine controller 46. In FIG. 14, the characters AR1 designate a running zone in which the engine 11 is run, characters AR2 designate a stop zone in which the run of the engine 11 is stopped, and characters AR3 designate a hysteresis zone. Moreover, characters LE1 designate a line on which the stopped engine 11 is run, and characters LE2 designate a line on which the run of the active engine 11 is stopped. Here, the line LE1 is moved the farther rightward of FIG. 14 for the more battery residue SOC thereby to narrow the drive zone AR1 but the farther leftward of FIG. 14 for the less battery residue SOC thereby to widen the drive zone AR1.

In case the engine 11 is not run although it is placed in the running zone AR1, the engine start control means (not-shown) of the engine controller 46 performs an engine start control to start the engine 11. In case the engine 11 is run although it is not placed in the running zone AR1, on the contrary, the engine stop control means (not-shown) of the engine controller 46 performs an engine stop control to stop the run of the engine 11. In case the engine 11 is not placed in the running zone AR1 so that it is stopped, moreover, the drive motor target torque calculation means (not-shown) of the vehicle controller 51 performs a drive motor target torque calculation to calculate and determine the vehicle demand torque TO* as the drive motor target torque TM*, and sends the drive motor target torque TM* to the drive motor controller 49. The drive motor control means (not-shown) of the drive motor controller 49 performs a drive motor control to control the torque of the drive motor 25.

In case the engine 11 is placed in the running zone AR1 and is being run, on the contrary, the engine control means (not-shown) of the engine controller 46 performs an engine control to control the engine 11 in a predetermined method.

Next, the generator target speed calculation means (not-shown) of the generator controller 47 performs a generator target speed calculation. Specifically, this calculation means calculates the ring gear speed NR on the basis of the drive motor rotor position θM and the gear ratio γR from the output shaft 26 (FIG. 3) to the ring gear R by reading the drive motor rotor position θM from the drive motor rotor position sensor 39, and calculates and determines the generator target speed NG* on the basis of the ring gear speed NR and the engine target speed NE* by reading the engine target speed NE*, which has been determined in the engine target running state setting.

In case the generator speed NG is low while the hybrid type vehicle thus constructed is being driven in a motor/engine running mode, the power consumption becomes so high to lower the power generation efficiency of the generator 16 so that the mileage of the hybrid type vehicle is accordingly deteriorated. Thus, the application condition decision means (not-shown) of the generator controller 47 performs an application condition decision to judge whether or not a predetermined application condition dictating that the absolute value of the generator speed NG is smaller than a predetermined speed has been satisfied.

Moreover, when the application condition is satisfied, the generator controller 47 judges whether the generator brake B is applied. In case this generator brake B is not applied, on the contrary, the generator brake application control means (not-shown) of the generator controller 47 performs a generator brake application control to apply the generator brake B by turning ON a brake signal dictating a generator brake application demand for the application of the generator brake B, thereby to turn ON a brake solenoid to feed the hydraulic servo with the brake pressure Pb. As a result, the ring gear speed NR and the engine speed NE take predetermined values, as shown in FIG. 15, but the generator speed NG is set to zero (0).

In case the application condition is not satisfied, on the contrary, the generator controller 47 judges whether the generator brake B has been released. In case this generator brake B is released, moreover, the generator speed control means (not-shown) of the generator controller 47 performs a generator speed control to control the torque of the generator 16 on the basis of the generator speed NG.

In case the generator brake B is not released, on the contrary, the generator brake release control means of the generator controller 47 performs a generator brake release control to release the generator brake B by turning OFF the brake signal thereby to turn OFF the brake solenoid to drain the brake pressure Pb from the hydraulic servo.

In the generator speed control, the torque control of the generator 16 is made on the basis of the generator target torque TG* and the generator speed NG by reading the generator target torque TG* so that the predetermined generator torque TG is generated. Then, the engine torque TE, the ring gear torque TR and the generator torque TG receives their own reactions, as has been described hereinbefore, so that the generator torque TG is converted into the ring gear torque TR and is outputted from the ring gear R.

As the ring gear torque TR is outputted from the ring gear R, moreover, the generator speed NG and the ring gear torque TR are fluctuated. Then, this fluctuated ring gear torque TR is transmitted to the drive wheel 37 so that the running feeling of the hybrid type vehicle is degraded. Therefore, the ring gear torque TR is calculated by estimating the torque corresponding to those inertias (i.e., the inertias of the rotor 21 and the rotor shaft) of the generator 16, which accompany the fluctuation of the generator speed NG.

For this calculation, the ring gear torque calculation means (not-shown) of the vehicle controller 51 performs a ring gear torque calculation to calculate the ring gear torque TR on the basis of the generator target torque TG* and the ratio of the tooth number of the ring gear R to that of the sun gear S.

If the generator 16 has an inertia InG and an angular acceleration (or a rate of rotational change) αG, more specifically, the torque to be applied to the sun gear S, i.e., a sun gear torque TS is obtained by adding the following torque equivalent component (or an inertia torque) TGI of the inertia InG to the generator target torque TG*:

$$TGI = InG \cdot \alpha G.$$

The sun gear torque TS is expressed by:

$$TS = TG^* + TGI \qquad (3)$$
$$= TG^* + InG \cdot \alpha G.$$

Here, the torque equivalent component TGI usually takes a negative value with respect to the acceleration direction, while the hybrid type vehicle is being accelerated, but a positive value with respect to the acceleration direction while the hybrid type vehicle is being decelerated. On the other hand, the angular acceleration αG is calculated by differentiating the generator speed NG.

If the tooth number of the ring gear R is ρ times as large as that of the sun gear S, moreover, the ring gear torque TR is expressed, as follows, because it is ρ times as high as the sun gear torque TS:

$$TR = \rho \cdot TS \quad (4)$$
$$= \rho \cdot (TG^* + TGI)$$
$$= \rho \cdot (TG^* + InG \cdot \alpha G).$$

Thus, the ring gear torque TR can be calculated from the generator target torque TG* and the torque equivalent component TGI.

For these operations, the drive shaft torque estimation means (not-shown) of the drive motor controller 49 performs a drive shaft torque estimation to estimate a torque at the output shaft 26, i.e., a drive shaft torque, TR/OUT on the basis of the generator target torque TG* and the torque equivalent component TGI. Specifically, the drive shaft torque estimation means estimates and calculates the drive shaft torque TR/OUT on the basis of the ring gear torque TR and the ratio of the tooth number of the counter drive gear 27 to that of the ring gear R.

When the generator brake B is applied, the generator target torque TG* is set to zero so that the ring gear torque TR has a proportional relation to the engine torque TE. When the generator brake B is applied, therefore, the drive shaft torque estimation means estimates the drive shaft torque TR/OUT on the basis of the ring gear torque TR and the ratio of the tooth number of the second counter drive gear 27 to that of the ring gear R by reading the engine torque TE from the engine controller 46 thereby to calculate the ring gear torque TR on the basis of the engine torque TE according to the torque relation.

Subsequently, the drive motor target torque calculation means performs a drive motor target torque calculation to calculate and determine the excess and deficiency of the drive shaft torque TR/OUT as the drive motor target torque TM* by subtracting the drive shaft torque TR/OUT from the vehicle demand torque TO*.

Then, the drive motor control means performs a drive motor control to control the drive motor torque TM by controlling the torque of the drive motor 25 on the basis of the drive motor target torque TM* determined.

When the driver depresses the brake pedal 61 while the hybrid type vehicle is being driven with the generator brake B being applied, for example, the ring gear speed NR lowers as the vehicle speed V lowers. At this time, however, a generator target speed NG* at a first speed NGth1 or higher is generated to correspond to the engine target speed NE* and the ring gear speed NR so that the generator brake B is released.

When the driver depresses the brake pedal 61 abruptly while the hybrid type vehicle is being driven at a low speed with the generator brake B being applied, the vehicle speed V abruptly lowers. At this time, the ring gear speed NR lowers with the generator brake B being applied. As a result, the speed of the carrier CR accordingly lowers, and the engine 11 connected to the carrier CR may be stalled by a stalling torque ("en-st").

When the driver depresses the brake pedal 61 abruptly so that the ring gear speed NR lowers, as shown in FIG. 16, the generator speed NG remains at 0 so that the engine speed NE accordingly lowers. As a result, the engine 11 may be stalled.

Therefore, the braking time release control means (not-shown) of the generator controller 47 performs a braking time release control to change the time period for releasing the generator brake B, i.e., the release time, by deciding the braking state according to the depression mode of the brake pedal 61 by the driver thereby to determine whether or not the generator brake B is to be released, from the decision result.

Flow charts of FIGS. 8 to 10 will be described in the following:

Step S1: The routine is initialized.
Step S2: The accelerator pedal position AP and the brake pedal position BP are read in.
Step S3: The vehicle speed V is calculated.
Step S4: The vehicle demand torque TO* is determined.
Step S5: It is judged whether the vehicle demand torque TO* is higher than the drive motor maximum torque TMmax. The routine advances to Step S6, in case the vehicle demand torque TO* is higher than the drive motor maximum torque TMmax, but to Step S8 in case the vehicle demand torque TO* is the drive motor maximum torque TMmax or less.
Step S6: It is judged whether the engine 11 is being stopped. The routine advances to
Step S7, in case the engine 11 is being stopped, but otherwise (or being run) to Step S8.
Step S7: The abrupt acceleration control is performed to end the routine.
Step S8: The driver demand output PD is calculated.
Step S9: The battery charge/discharge demand output PB is calculated.
Step S10: The vehicle demand output PO is calculated.
Step S11: The running point of the engine 11 is determined.
Step S12: It is judged whether the engine 11 is placed in the running zone AR1. The routine advances to Step S13, in case the engine 11 is placed in the running zone AR1, but otherwise to Step S14.
Step S13: It is judged whether the engine 11 is run. The routine advances to Step S17, in case the engine 11 is being run, but otherwise to Step S15.
Step S14: It is judged whether the engine 11 is run. The routine advances to Step S16, in case the engine 11 is being run, but otherwise to Step S28.
Step S15: The engine start control is performed to end the routine.
Step S16: The engine stop control is performed to end the routine.
Step S17: The engine control is performed.
Step S18: The generator target speed NG* is determined.
Step S19: The application condition decision is performed.
Step S20: It is judged whether the application condition has been satisfied. The routine advances to Step S22, in case the application condition is satisfied, but otherwise to Step S21.
Step S21: It is judged whether the generator brake B is released. The routine advances to Step S26, in case the generator brake B is released, but otherwise to Step S25.
Step S22: It is judged whether the generator brake B is applied. The routine advances to Step S24, in case the generator brake B is applied, but otherwise to Step S23.
Step S23: The generator brake application control is performed to end the routine.
Step S24: The braking time release control is performed to end the routine.

Step S25: The generator brake release control is performed to end the routine.
Step S26: The generator speed control is performed.
Step S27: The drive shaft torque TR/OUT is estimated.
Step S28: The drive motor target torque TM* is determined.
Step S29: The drive motor control is performed to end the routine.

A subroutine of the abrupt acceleration control at Step S7 of FIG. 8 will be described in the following.

Figure 17:
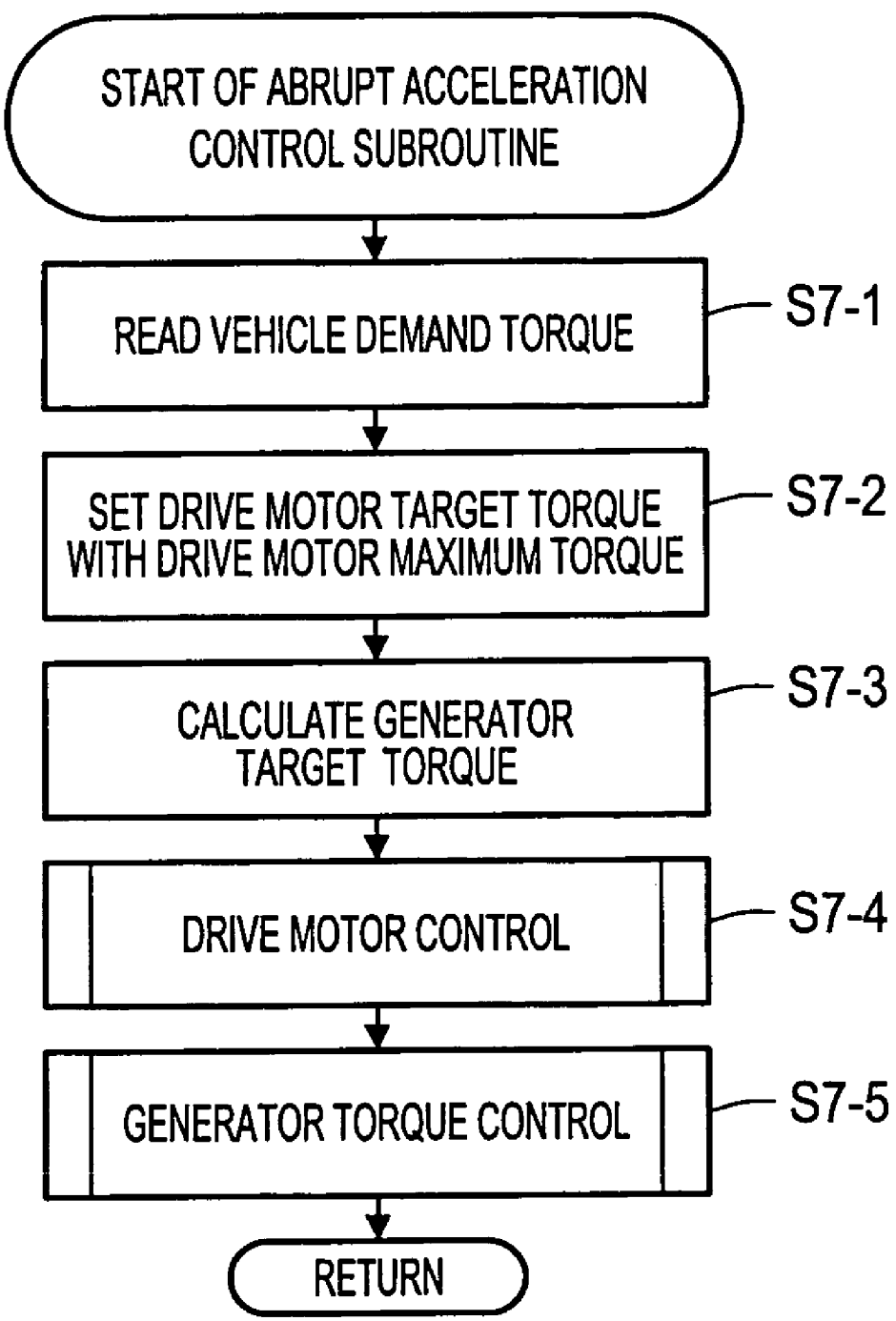
FIG. 17 is a diagram showing a subroutine of an abrupt acceleration control in the first embodiment of the invention.

FIG. 17 is a diagram showing the subroutine of the abrupt acceleration control in the first embodiment of the invention. At first, the abrupt acceleration control means reads in the vehicle demand torque TO* and sets the drive motor target torque TM* with the drive motor maximum torque TMmax. Subsequently, the generator target torque calculation means (not-shown) of the vehicle controller 51 (FIG. 7) performs a generator target torque calculation to calculate a difference torque ΔT between the vehicle demand torque TO* and the drive motor target torque TM*, and to calculate and determine the shortage of the drive motor maximum torque TMmax or the drive motor target torque TM* as the generator target torque TG* thereby to send the generator target torque TG* to the generator controller 47.

The drive motor control means performs a drive motor control to control the torque of the drive motor 25 with the drive motor target torque TM*. The generator torque control means (not-shown) of the generator controller 47 performs a generator torque control to perform a torque control of the generator 16 on the basis of the generator target torque TG*.

The flow chart of FIG. 17 will be described in the following:
Step S7-1: The vehicle demand torque TO* is read in.
Step S7-2: The drive motor target torque TM* is set with the drive motor maximum torque TMmax.
Step S7-3: The generator target torque TG* is calculated.
Step S7-4: The drive motor control is performed.
Step S7-5: The generator torque control is performed to return the routine.

A subroutine of a drive motor control subroutine of Step S29 of FIG. 10 and Step S7-4 of FIG. 17 will be described in the following.

Figure 18:
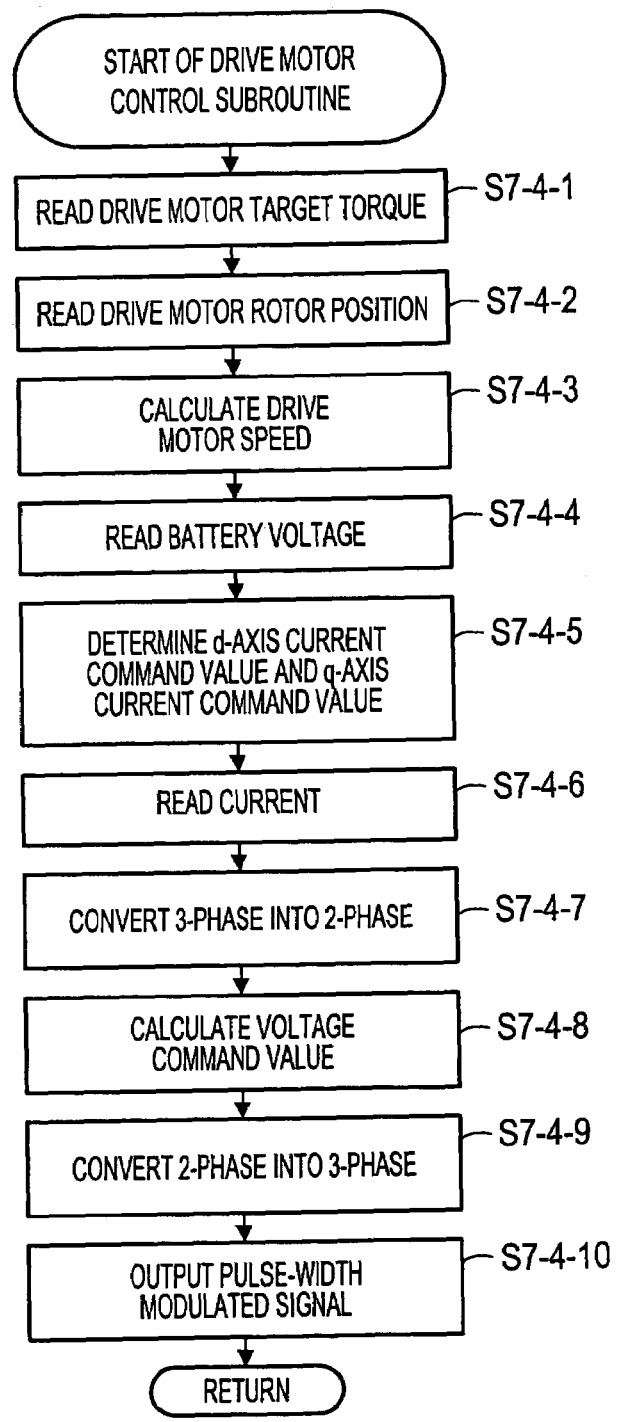
FIG. 18 is a diagram showing a subroutine of a drive motor control in the first embodiment of the invention.

FIG. 18 is a diagram showing the subroutine of the drive motor control in the first embodiment of the invention. At first, the drive motor control means (not-shown) reads in the drive motor target torque TM*. Subsequently, the drive motor speed calculation means calculates the drive motor speed NM by reading in the drive motor rotor position θM to calculate the rate of change ΔθM of the drive motor rotor position θM. The drive motor control means reads in the battery voltage VB. Here, the drive motor speed NM and the battery voltage VB compose a measured value.

Next, the drive motor control means calculates and determines a d-axis current command value IMd* and a q-axis current command value IMq* on the basis of the drive motor target torque TM*, the drive motor speed NM and the battery voltage VB and with reference to the drive motor controlling current command map, which is recorded in the recorder of the drive motor controller 49 (FIG. 7). Here, the d-axis current command value IMd* and the q-axis current command value IMq* compose an AC current command value for the drive motor 25.

Moreover, the drive motor control means reads the currents IMU and IMV from the current sensors 68 and 69 and calculates the following current IMW on the basis of the currents IMU and IMV:

$$IMW = IMU - IMV.$$

Like the currents IMU and IMV, however, the current IMW could also be detected by the current sensor.

Subsequently, the AC current calculation means of the drive motor control means performs an AC current calculation to calculate the d-axis current IMd and the q-axis current IMq by performing a 3-phase/2-phase conversion thereby to convert the currents IMU, IMV and IMW into a d-axis current IMd and a q-axis current IMq or AC currents. Moreover, the AC voltage command value calculation means of the drive motor control means performs an AC voltage command value calculation to calculate voltage command values VMd* and VMq* on the basis of the d-axis current IMd and the q-axis current IMq, and the d-axis current command value IMd* and the q-axis current command value IMq*. On the other hand, the drive motor control means performs a 2-phase/3-phase conversion to convert the voltage command values VMd* and VMq* into voltage command values VMU*, VMV* and VMW*, and calculates the pulse width modulated signals SU, SV and SW on the basis of the voltage command values VMU*, VMV* and VMW* and outputs the pulse width modulated signals SU, SV and SW to the not-shown drive processing means of the drive motor controller 49. The drive processing means performs a drive processing to send the drive signal SG2 to the inverter 29 on the basis of the pulse width modulated signals SU, SV and SW. Here, the voltage command values VMd* and VMq* compose the AC voltage command value for the drive motor 25.

The flow chart of FIG. 18 will be described in the following in which the operations are common between Step S27 and Step S7-4 so that they will be described on Step S7-4.

Step S7-4-1: The drive motor target torque TM* is read in.
Step S7-4-2: The drive motor rotor position θM is read in.
Step S7-4-3: The drive motor speed NM is calculated.
Step S7-4-4: The battery voltage VB is read in.
Step S7-4-5: The d-axis current command value IMd* and the q-axis current command value IMq* are determined.
Step S7-4-6: The currents IMU and IMV are read in.
Step S7-4-7: The 3-phase is converted into the 2-phase.
Step S7-4-8: The voltage command values VMd* and VMq* are calculated.
Step S7-4-9: The 2-phase is converted into the 3-phase.
Step S7-4-10: The pulse width modulated signals SU, SV and SW are outputted to return the routine.

A subroutine of the generator torque control at Step S7-5 of FIG. 17 will be described in the following.

Figure 19:
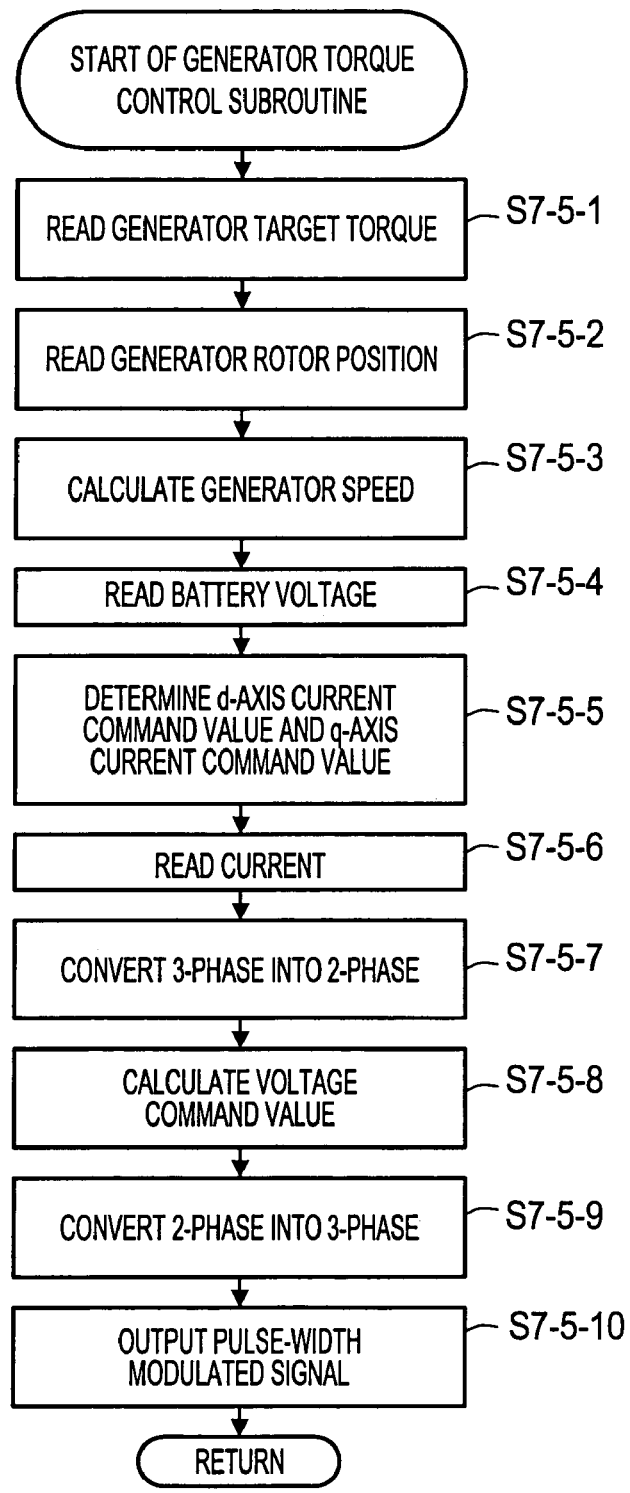
FIG. 19 is a diagram showing a subroutine of a generator torque control in the first embodiment of the invention.

FIG. 19 is a diagram showing the subroutine of the generator torque control in the first embodiment of the invention. At first, the generator torque control means (not-shown) calculates the generator speed NG by reading in the generator target torque TG* and the generator rotor position θG and by calculating the rate of change ΔθG of the generator rotor position θG, and then reads in the battery voltage VB. Here, the generator speed NG and the battery voltage VB compose a measured value. Next, the generator torque control means calculates and determines a d-axis current command value IGd* and a q-axis current command value IGq* on the basis of the generator target torque TG*, the generator speed NG and the battery voltage VB and with reference to the generator controlling current command map, which is recorded in the recorder of the generator controller 47 (FIG. 7). Here, the d-axis current command value IGd* and the q-axis current command value IGq* compose an AC current command value for the generator 16.

Moreover, the generator torque control means reads the currents IGU and IGV from the current sensors 66 and 67 and calculates the following current IGW on the basis of the currents IGU and IGV:

$$IGW=IGU-IGV.$$

Like the currents IGU and IGV, however, the current IGW could also be detected by the current sensor.

Subsequently, the AC current calculation means of the generator torque control means performs an AC current calculation to calculate the d-axis current IGd and the q-axis current IGq by performing a 3-phase/2-phase conversion thereby to convert the currents IGU, IGV and IGW into a d-axis current IGd and a q-axis current IGq. Moreover, the AC voltage command value calculation means of the generator torque control means performs an AC voltage command value calculation to calculate voltage command values VGd* and VGq* on the basis of the d-axis current IGd and the q-axis current IGq, and the d-axis current command value IGd* and the q-axis current command value IGq*. On the other hand, the generator torque control means performs a 2-phase/3-phase conversion to convert the voltage command values VGd* and VGq* into voltage command values VGU*, VGV* and VGW*, and calculates the pulse width modulated signals SU, SV and SW on the basis of the voltage command values VGU*, VGV* and VGW* and outputs the pulse width modulated signals SU, SV and SW to the not-shown drive processing means of the generator controller 47. The drive processing means performs a drive processing to send the drive signal SG2 to the inverter 28 on the basis of the pulse width modulated signals SU, SV and SW. Here, the voltage command values VGd* and VGq* compose the AC voltage command value for the generator 16.

The flow chart of FIG. 19 will be described in the following:

Step S7-5-1: The generator target torque TG* is read in.
Step S7-5-2: The generator rotor position θG is read in.
Step S7-5-3: The generator speed NG is calculated.
Step S7-5-4: The battery voltage VB is read in.
Step S7-5-5: The d-axis current command value IGd* and the q-axis current command value IGq* are determined.
Step S7-5-6: The currents IGU and IGV are read in.
Step S7-5-7: The 3-phase is converted into the 2-phase.
Step S7-5-8: The voltage command values VGd* and VGq* are calculated.
Step S7-5-9: The 2-phase is converted into the 3-phase.
Step S7-5-10: The pulse width modulated signals SU, SV and SW are outputted to return the routine.

A subroutine of the engine start control at Step S15 of FIG. 9 will be described in the following.

Figure 20:
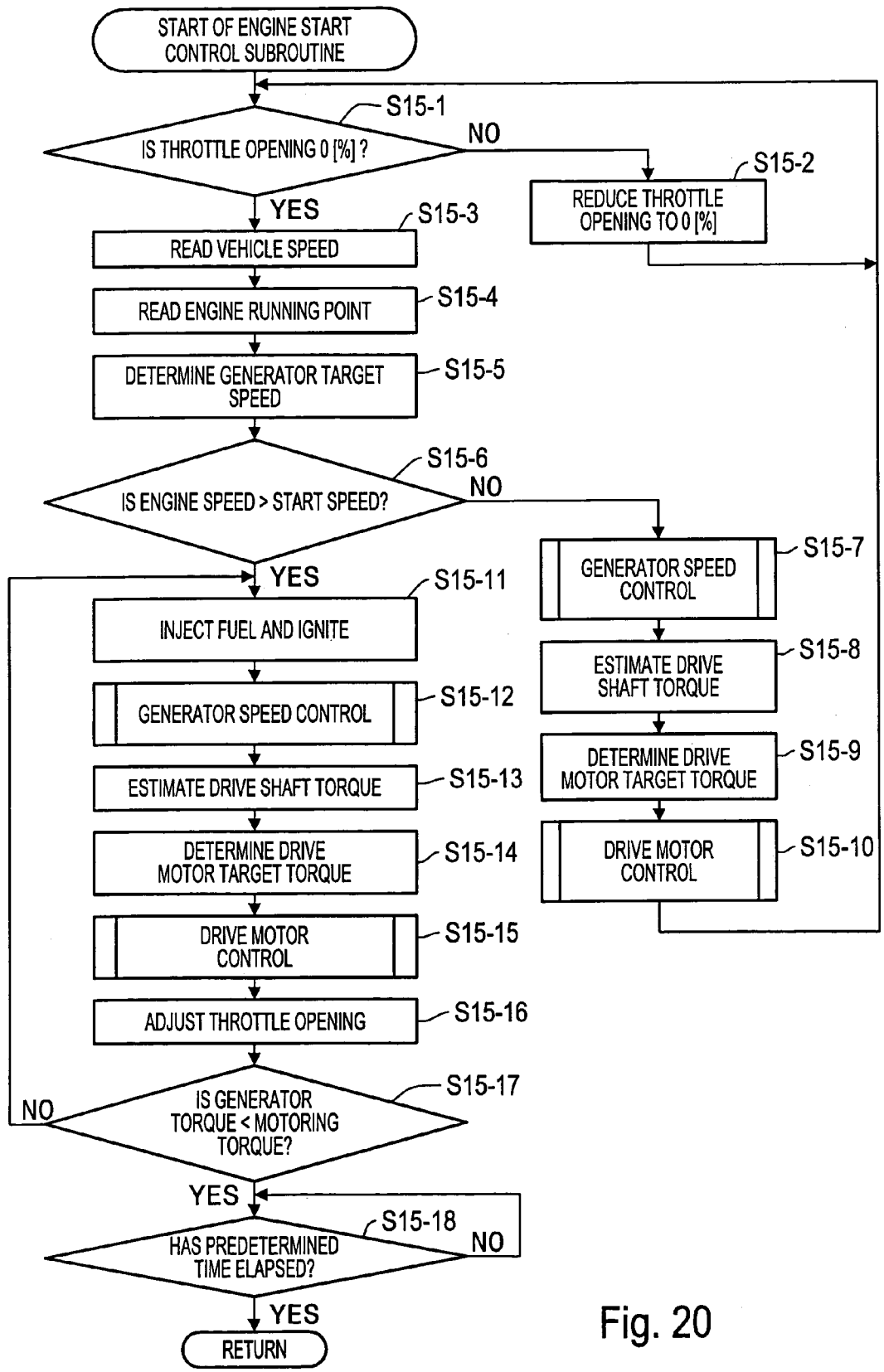
FIG. 20 is a diagram showing a subroutine of an engine start control in the first embodiment of the invention.

FIG. 20 is a diagram showing the subroutine of the engine start control in the first embodiment of the invention. At first, the engine start control means reads in the throttle opening θ. In case the throttle opening θ is zero [%], the engine start control means reads in the vehicle speed V calculated by the vehicle speed calculation means and the running point of the engine 11 (FIG. 7) determined in the engine target running state setting.

Subsequently, the generator target speed calculation means (not-shown) performs a generator target speed calculation, as described hereinbefore, to calculate the ring gear speed NR on the basis of the drive motor rotor position θM and the gear ratio γR by reading the drive motor rotor position θM, and to calculate and decide the generator target speed NG* with the speed relation on the basis of the ring gear speed NR and an engine target speed NE* by reading the engine target speed NE* at the running point.

The engine controller 46 compares the engine speed NE and a preset start speed NEth1, to judge whether the engine speed NE is higher than the start speed NEth1. In case the engine speed NE is higher than the start speed NEth1, the engine start control means performs the fuel injection and the ignition in the engine 11.

Subsequently, the generator speed control means performs the generator speed control on the basis of the generator target speed NG*, to raise the generator speed NG and accordingly the engine speed NE.

The drive motor controller 49 performs the drive motor control, as performed at Steps S27 to S29, by estimating the drive shaft torque TR/OUT thereby to determine the drive motor target torque TM*.

The engine start control means adjusts the throttle opening θ so that the engine speed NE may be the engine target speed NE*. In order to judge whether the engine 11 is normally run, the engine start control means then judges whether the generator torque TG is lower than a motoring torque TEth at the start of the engine 11, and awaits the lapse of a predetermined time while the generator torque TG is lower than the motoring torque TEth.

In case the engine speed NE is at the start speed NEth1 or less, the generator speed control means performs the generator speed control on the basis of the generator target speed NG*. Subsequently, the drive motor controller 49 performs the drive motor control, as performed at Steps S27 to S29, by estimating the drive shaft torque TR/OUT thereby to determine the drive motor target torque TM*.

The flow chart of FIG. 20 will be described in the following:

Step S15-1: It is judged whether or not the throttle opening θ is zero [%]. The routine advances to Step S15-3, in case the throttle opening θ is zero [%], but otherwise to Step S15-2.
Step S15-2: The throttle opening θ is set to zero [%] to return the routine to Step S15-1.
Step S15-3: The vehicle speed V is read in.
Step S15-4: The running point of the engine 11 is read in.
Step S15-5: The generator target speed NG* is determined.
Step S15-6: It is judged whether the engine speed NE is higher than the start speed NEth1. The routine advances to Step S15-11, in case the engine speed NE is higher than the start speed NEth1, but to Step S15-7 in case the engine speed NE is at the start speed NEth1 or less.
Step S15-7: The generator speed control is performed.
Step S15-8: The drive shaft torque TR/OUT is estimated.
Step S15-9: The drive motor target torque TM* is determined.
Step S15-10: The drive motor control is performed to return the routine to Step S15-1.
Step S15-11: The fuel injection and the ignition are performed.
Step S15-12: The generator speed control is performed.
Step S15-13: The drive shaft torque TR/OUT is estimated.
Step S15-14: The drive motor target torque TM* is determined.
Step S15-15: The drive motor control is performed.
Step S15-16: The throttle opening θ is adjusted.
Step S15-17: It is judged whether the generator torque TG is lower than the motoring torque TEth. The routine advances to Step S15-18, in case the generator torque TG is lower than the motoring torque TEth, but to Step S15-11 in case the generator torque TG is at the motoring torque TEth or higher.

Step S15-18: The lapse of a predetermined time is awaited, and the routine is returned after the lapse.

A subroutine of the generator speed control at Step S26 of FIG. 10 and at Steps S15-7 and S15-12 of FIG. 20 will be described in the following.

Figure 21:
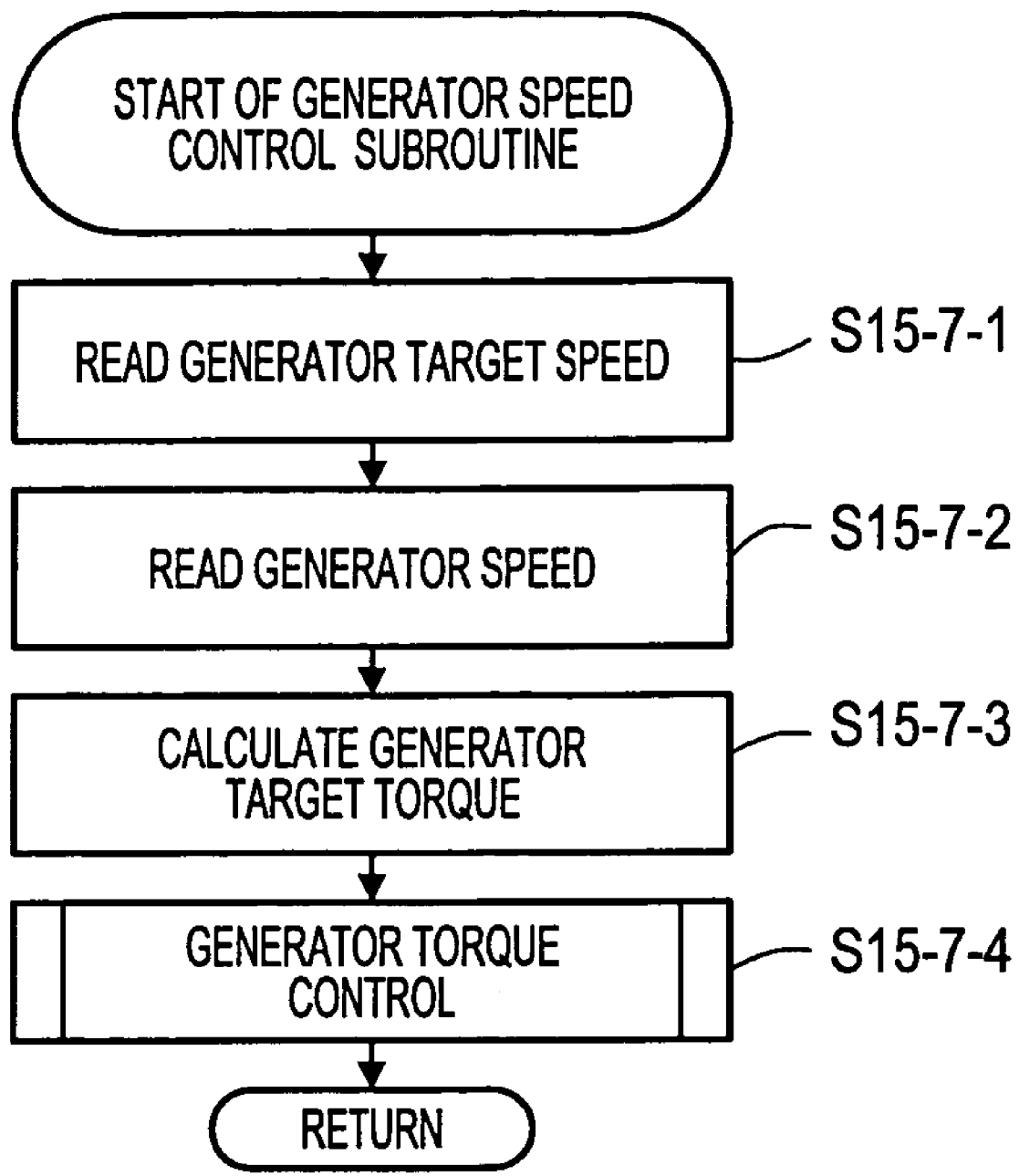
FIG. 21 is a diagram showing a subroutine of a generator speed control in the first embodiment of the invention.

FIG. 21 is a diagram showing the subroutine of the generator speed control in the first embodiment of the invention. At first, the generator speed control means (not-shown) performs a PI control on the basis of a differential speed ΔNG between the generator target speed NG* and the generator speed NG by reading the generator target speed NG* and the generator speed NG, thereby to calculate the generator target torque TG*. In this case, the higher differential speed ΔNG, the higher the generator target torque TG* is made and its positive/negative values are considered.

Subsequently, the generator torque control means performs the generator torque control of FIG. 19 and the torque control of the generator 16 (FIG. 7).

Next, the flow chart of FIG. 21 will be described in the following. In this case, the operations are common among Step S26 and Steps S15-7 and S15-12 so that they will be described on Step S15-7.

Step S15-7-1: The generator target speed NG* is read in.
Step S15-7-2: The generator speed NG is read in.
Step S15-7-3: The generator target torque TG* is calculated.
Step S15-7-4: The generator torque control is performed to return the routine.

Next, the subroutine of the engine stop control at Step S16 of FIG. 9 will be described in the following.

Figure 22:
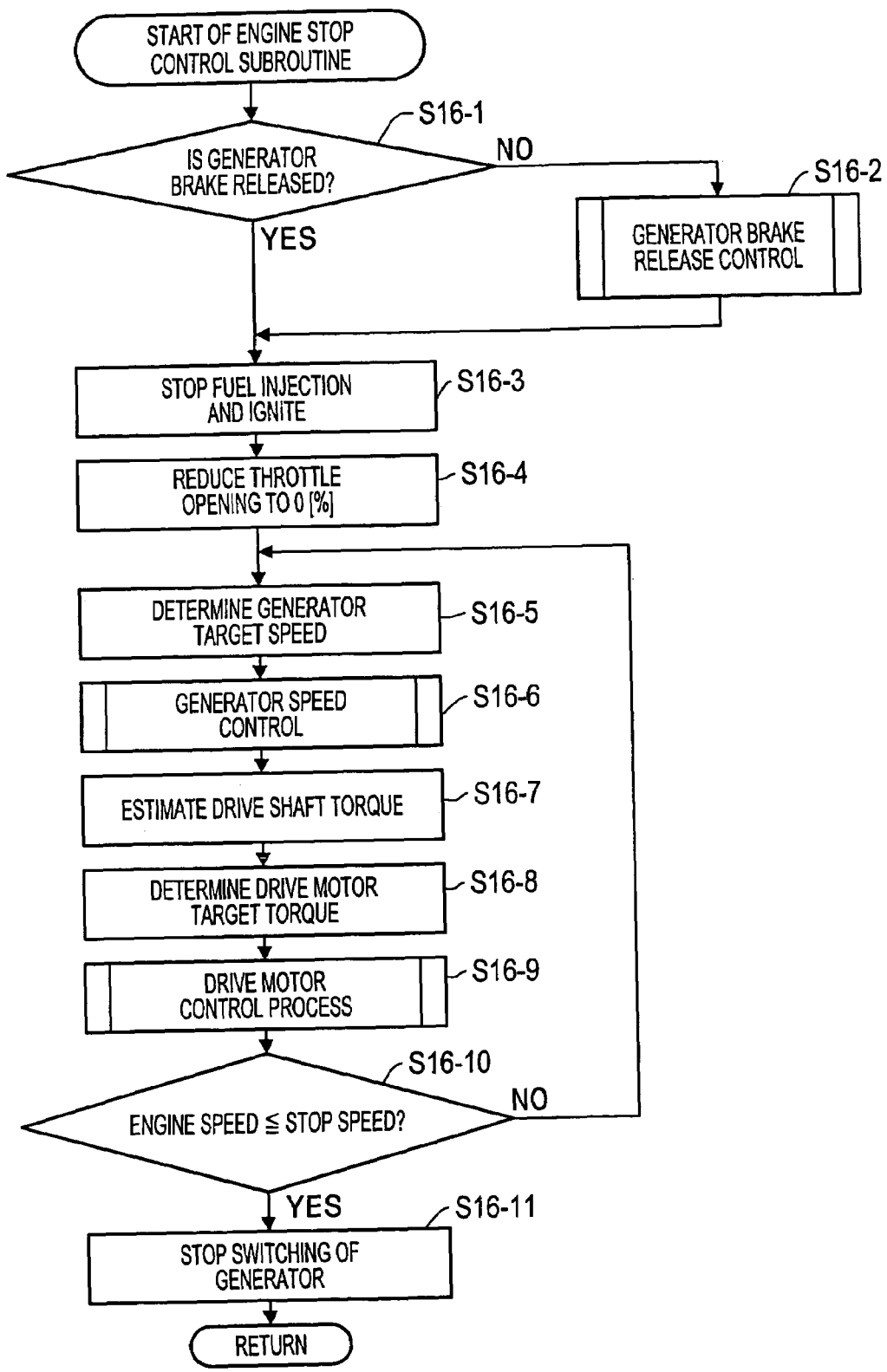
FIG. 22 is a diagram showing a subroutine of an engine stop control in the first embodiment of the invention.

FIG. 22 is a diagram showing the subroutine of the engine stop control in the first embodiment of the invention. At first, the generator controller 47 (FIG. 7) judges whether the generator brake B is released. In case the generator brake B is not released but applied, the generator brake release control means performs the generator brake release control to release the generator brake B.

In case the generator brake B is released, the engine stop control means stops the fuel injection and the ignition in the engine 11 and sets the throttle opening θ to zero [%].

Subsequently, the engine stop control means (not-shown) determines the generator target speed NG* with the speed relation on the basis of the ring gear speed NR and the engine target speed NE* (0[rpm]) by reading the ring gear speed NR. The generator controller 47 performs the generator speed control of FIG. 21. Then, the drive motor controller 49 performs the drive motor control by estimating the drive shaft torque TR/OUT and by determining the drive motor target torque TM*, as performed at Steps S27 to S29.

Next, the generator controller 47 judges whether the engine speed NE is at a stop speed NEth2 or less. In case the engine speed NE is at the stop speed NEth2 or less, the generator controller 47 starts a shut-down control to stop the switching of the generator 16 thereby to stop (or shut down) the generator 16.

The flow chart of FIG. 22 will be described in the following:

Step S16-1: It is judged whether the generator brake B is released. The routine advances to Step S16-3, in case the generator brake B is released, but otherwise to Step S16-2.
Step S16-2: The generator brake release control is performed.
Step S16-3: The fuel injection and the ignition are stopped.
Step S16-4: The throttle opening θ is set to zero [%].
Step S16-5: The generator target speed NG* is determined.
Step S16-6: The generator speed control is performed.
Step S16-7: The drive shaft torque TR/OUT is estimated.
Step S16-8: The drive motor target torque TM* is determined.
Step S16-9: The drive motor control is performed.
Step S16-10: It is judged whether the engine speed NE is at the stop speed NEth2 or less. The routine advances to Step S16-11, in case the engine speed NE is at the stop speed NEth2 or less, but returns to Step S16-5 in case the engine speed NE is higher than the stop speed NEth2.
Step S16-11: The switching for the generator 16 is stopped to return the routine.

The subroutine of the application condition decision at Step S19 of FIG. 10 will be described in the following.

Figure 23:
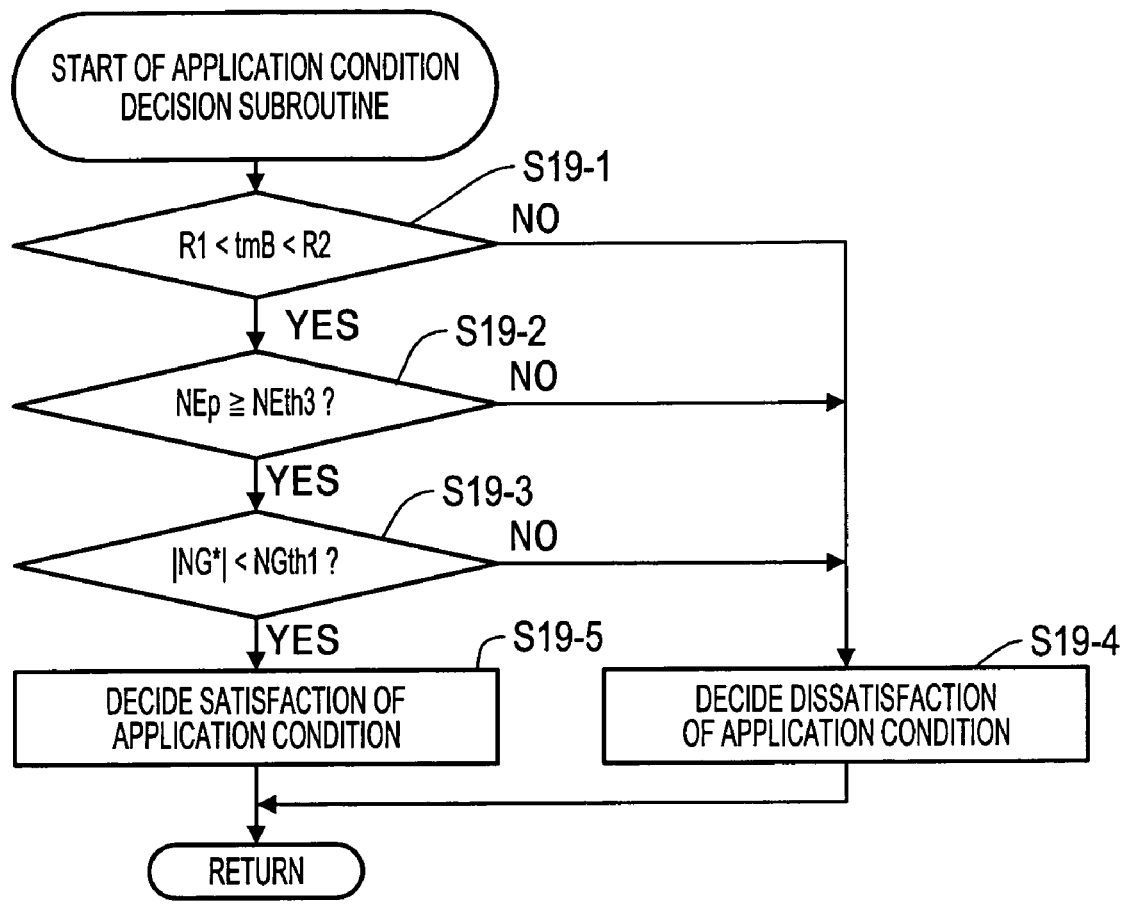
FIG. 23 is a diagram showing a subroutine of an application condition decision in the first embodiment of the invention.

FIG. 23 is a diagram showing the subroutine of the application condition decision in the first embodiment of the invention. At first, the application condition decision means reads the oil temperature tmB from the oil temperature sensor 59 (FIG. 7), and judges whether or not the oil temperature tmB is confined within a predetermined range, i.e., within the following range:

$$R1 < tmB < R2.$$

Here, characters R1 designate the lower limit of the oil temperature tmB, and characters R2 designate the upper limit of the oil temperature tmB. In case the oil temperature is confined with the predetermined range, moreover, the application condition decision means calculates the engine speed NE (as will be called the "parallel engine speed NEp") at the time when the generator speed NG is reduced to 0 by applying the generator brake B, as shown in FIG. 15, on the basis of the ring gear speed NR by reading the ring gear speed NR and the generator target speed NG*.

Next, the application condition decision means (not-shown) judges whether a first condition is satisfied, in dependence upon whether the parallel engine speed NEp is at a threshold value NEth3 (e.g., 1,300 [rpm]) or larger, and judges whether a second condition is satisfied, in dependence upon whether the absolute value of the generator target speed NG* is smaller than the first speed NGth1 (e.g., 100 [rpm]).

In case the parallel engine speed NEp is at the threshold value NEth3 and more whereas the absolute value of the generator target speed NG* is smaller than the first speed NGth1 so that the first and second conditions are satisfied, the application condition decision means decides that the application condition is satisfied. In case either the parallel engine speed NEp is lower than the threshold value NEth3 or the absolute value of the generator target speed NG* is at the first speed NGth1 or higher so that at least one of the first and second conditions is not satisfied, on the contrary, the application condition decision means decides that the application condition is not satisfied.

Even if the generator target speed NG* is so low that the generator speed NG is low, the application condition is not satisfied not to apply the generator brake B in case the parallel engine speed NEp is lower than the threshold value NEth3. Therefore, it is possible to prevent the engine speed NE from becoming lower than the threshold value NEth3 as the generator brake B is applied, thereby to prevent the engine 11 from being stalled.

Here, the generator brake B is applied by raising the brake pressure Pb so that the lower oil temperature tmB the more its application is delayed. Therefore, the application condition decision means is enabled to further prevent the engine 11 from being stalled, by changing the threshold value NEth3 and the first speed NGth1 according to the oil temperature tmB so that the lower oil temperature tmB the larger the threshold value NEth3 may become and so that the lower oil temperature tmB the lower the first speed NGth1 may be.

The flow chart of FIG. 23 will be described in the following:

Step S19-1: It is judged whether the oil temperature tmB is confined within a predetermined range. The routine advances to Step S19-2, in case the oil temperature tmB is confined within the predetermined range, but otherwise to Step S19-4.

Step S19-2: It is judged whether the parallel engine speed NEp is at the threshold value NEth3 or higher. The routine advances to Step S19-3, in case the parallel engine speed NEp is at the threshold value NEth3 or higher, but to Step S19-4 in case the parallel engine speed NEp is lower than the threshold value NEth3.

Step S19-3: It is judged whether the absolute value of the generator target speed NG* is smaller than the first speed NGth1. The routine advances to Step S19-5, in case the absolute value of the generator target speed NG* is smaller than the first speed NGth1, but to Step S19-4 in case the absolute value of the generator target speed NG* is at the first speed NGth1 or higher.

Step S19-4: It is decided that the application condition is not satisfied, and the routine is returned.

Step S19-5: It is decided that the application condition is satisfied, and the routine is returned.

Next, the generator brake application control subroutine at Step S23 of FIG. 10 will be described in the following.

Figure 24:
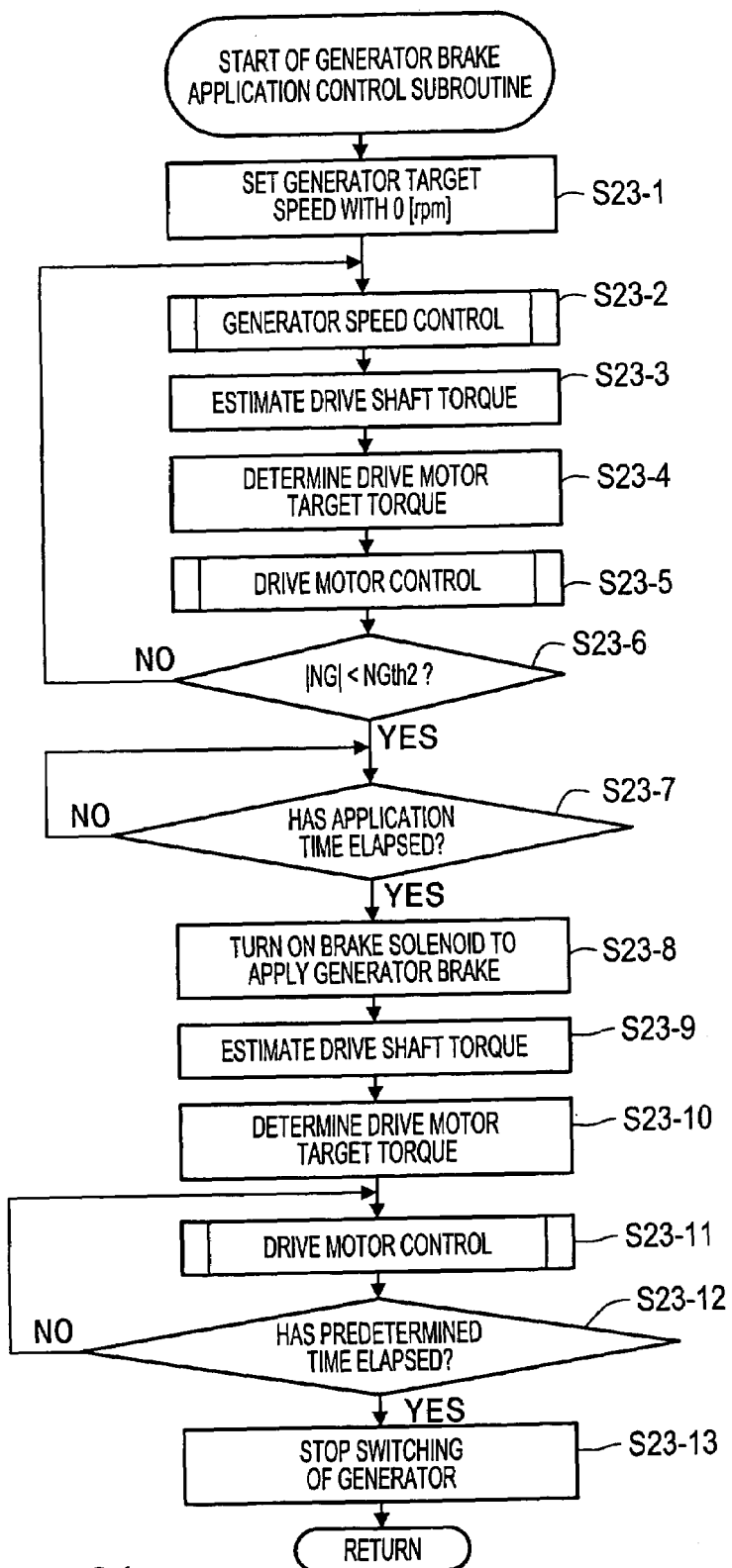
FIG. 24 is a diagram showing a subroutine of a generator brake application control in the first embodiment of the invention.

FIG. 24 is a diagram showing the subroutine of the generator brake application control in the first embodiment of the invention. At first, when the application condition is satisfied, the generator brake application control means sets the generator target speed NG* with zero [rpm], and starts the speed control of the generator 16 (FIG. 7) with the generator speed control of FIG. 21. Subsequently, the drive motor controller 49 performs the drive motor control by estimating the drive shaft torque TR/OUT to determine the drive motor target torque TM*, as performed at Steps S27 to S29. In the meanwhile, the generator torque TG is once lowered and then raised.

This exemplary embodiment has been described on the generator torque TG, in which the transfer is made from the acceleration state of the vehicle, for example, with both the generator torque TG and the generator speed NG being negative and with both the engine torque TE and the engine speed NE being positive, to the control to reduce the generator speed NG to zero. Despite of this description, however, the embodiment does not exclude the case, in which the transfer is made from the steady run of the vehicle with the generator torque TG being negative and with the generator speed NG, the engine torque TE and the engine speed NE being positive, to the control to reduce the generator speed NG to zero, and in which the generator torque TG is once raised and then reduced again.

Next, the generator brake application control means judges whether the absolute value of the generator speed NG is smaller than a second speed NGth2 (e.g., 100 [rpm]). When the absolute value of the generator speed NG becomes smaller than the second speed NGth2, the lapse of a predetermined application is awaited. When the application time elapses, the application means of the generator brake application control means performs an application to apply the generator brake B to stop the rotation of the generator 16 mechanically, by turning ON the brake signal to turn ON the brake solenoid thereby to feed the hydraulic servo with the brake pressure Pb.

In case the generator brake B is applied and the brake pressure Pb is gradually raised. Subsequently, the drive motor controller 49 performs the drive motor control by estimating the drive shaft torque TRIOUT and by determining the drive motor target torque TM*, as performed at Steps S27 to S29.

When a predetermined time Tf elapses after the brake solenoid is turned ON, the generator brake application control means starts a torque release control with the generator torque control of FIG. 19 thereby to reduce the generator torque TG gradually.

In the meanwhile, the generator target speed NG* is set with zero [rpm] in this exemplary embodiment, and the speed control of the generator 16 is performed by the PI control. As the generator speed NG comes closer to zero [rpm] in the speed control, the proportional component (or P-component) becomes smaller. When the generator speed NG becomes zero [rpm] so that the proportional component becomes zero, only the integral component (or I-component) is left. Subsequently, this integral component is reduced by a predetermined function (e.g., a function to limit the rate of change) so that the generator torque TG is gradually reduced.

In order to reduce the generator torque TG gradually, the torque control of the generator 16 could also be performed in place of the speed control of the generator 16. In this modification, the generator target torque TG* is gradually reduced with a predetermined function.

When the absolute value of the generator torque TG becomes smaller than the threshold value TGth1, the generator brake application control means starts the shut-down control to stop the switching of the generator 16 thereby to stop the generator 16.

Thus, the generator brake B is applied, and the generator torque TG is then gradually reduced. It is, therefore, also possible to delay the burden of the engine torque TE to be borne by the generator brake B. It is, therefore also possible to suppress the rise in the generator speed NG while the backlash of the parts such as the thin sheets composing the generator brake B is being reduced. As a result, it is possible to prevent any unusual chattering noise from being generated or the end plate of the stator (not-shown) (FIG. 3) from being broken, thereby to prevent the durability of the generator brake B from being degraded.

The flow chart of FIG. 24 will be described in the following:

Step S23-1: The generator target speed NG* is set with zero [rpm].

Step S23-2: The generator speed control is performed.

Step S23-3: The drive shaft torque TR/OUT is estimated.

Step S23-4: The drive motor target torque TM* is determined.

Step S23-5: The drive motor control is performed.

Step S23-6: It is judged whether the absolute value of the generator speed NG is smaller than the second speed NGth2. The routine advances to Step S23-7, in case the absolute value of the generator speed NG is lower than the second speed NGth2, but returns to Step S23-2 in case the absolute value of the generator speed NG is at the second speed NGth2 or larger.

Step S23-7: The lapse of the application time is awaited, and the routine advances to Step S23-8 after the lapse.

Step S23-8: The brake solenoid is turned ON to apply the generator brake B.

Step S23-9: The drive shaft torque TR/OUT is estimated.

Step S23-10: The drive motor target torque TM* is determined.

Step S23-11: The drive motor control is performed.

Step S23-12: It is judged whether the predetermined time Tf has elapsed. The routine advances to Step S23-13, in case the predetermined time Tf has elapsed, but otherwise returns to Step S23-11.

Step S23-13: The switching of the generator 16 is stopped to return the routine.

Next, the subroutine of the generator brake release control at Step S25 of FIG. 10 and at Step S16-2 of FIG. 22 will be described in the following.

Figure 25:
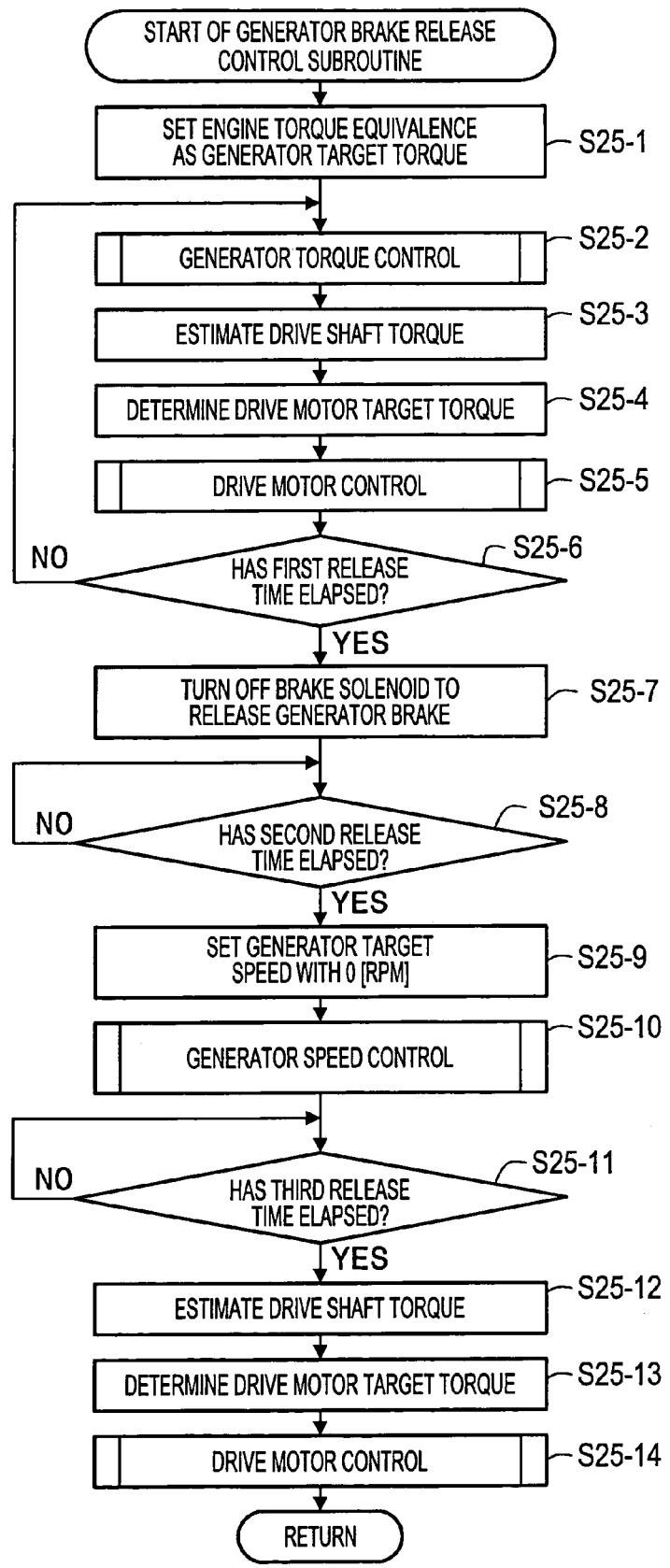
FIG. 25 is a diagram showing a subroutine of a generator brake release control in the first embodiment of the invention.

FIG. 25 is a diagram showing the subroutine of the generator brake release control in the first embodiment of the invention. In the generator brake application control, while the generator brake B (FIG. 7) is being applied, the predetermined engine torque TE is applied as a reaction force to the rotor 21 of the generator 16. As the engine torque TE is transmitted to the rotor 21 when the generator brake B is merely released, the generator torque TG and the engine torque TE change seriously and cause shocks. According to the release of the generator brake B, therefore, the generator torque TG is generated in the opposite direction to and in the same magnitude as that of the engine torque TE to be transmitted to the generator 16.

In the engine controller 46, the engine torque TE to be transmitted to the rotor 21 is estimated or calculated. The buckling torque control means of the generator brake release control means performs a buckling torque control to set an engine torque correspondence as the generator target torque TG* by reading the engine torque correspondence, i.e., the torque corresponding to the engine torque TE estimated or calculated. Subsequently, the buckling torque control means performs the generator torque control of FIG. 19 and then the drive controller 49 performs drive motor control by estimating the drive shaft torque TR/OUT and determining the drive motor target torque TM*, as performed at Steps S27 to S29.

Thus, the buckling torque control is performed. Even if the engine torque TE is transmitted to the rotor 21 as the generator brake B is released, therefore, the generator torque TG and the engine torque TE do not change so highly that the shocks can be prevented from occurring.

When a first release time elapses after the buckling torque control is started, the release means of the generator brake release control means performs a release to release the generator brake B by turning OFF the brake solenoid. When a second release time elapses, the zero rotation control means of the generator brake release control means performs a zero rotation control. For this control, the zero rotation control means performs the generator speed control of FIG. 21, after it sets the generator target speed NG* with zero [rpm]. After a third release time elapses, the drive motor controller 49 performs the drive motor control by estimating the drive shaft torque TR/OUT and determining the drive motor target torque TM*, as performed at Steps S27 to S29. Here, the engine torque correspondence is estimated or calculated by learning the torque ratio of the generator torque TG to the engine torque TE.

Next, the flow chart of FIG. 25 will be described in the following. In this case, the operations are common among Step S16-2 and Step S25 so that they will be described on Step S25.

Step S25-1: The engine torque correspondence is set as the generator target torque TG*.

Step S25-2: The generator torque control is performed.

Step S25-3: The drive shaft torque TR/OUT is estimated.

Step S25-4: The drive motor target torque TM* is determined.

Step S25-5: The drive motor control is performed.

Step S25-6: It is judged whether the first release time has elapsed. The routine advances to Step S25-7, in case the first release time has elapsed, but otherwise returns to Step S25-2.

Step S25-7: The brake solenoid is turned OFF to release the generator brake B.

Step S25-8: The lapse of the second release time is awaited, and the routine advances to Step S25-9 after the lapse.

Step S25-9: The generator target speed NG* is set to zero [rpm].

Step S25-10: The generator speed control is performed.

Step S25-11: It is judged whether the third release time has elapsed. The routine advances to Step S25-12, in case the third release time has elapsed, but otherwise returns to Step S25-10.

Step S25-12: The drive shaft torque TR/OUT is estimated.

Step S25-13: The drive motor target torque TM* is determined.

Step S25-14: The drive motor control is performed to return the routine.

Next, the subroutine of the braking time release control at Step S24 of FIG. 10 will be described in the following.

Figure 26:
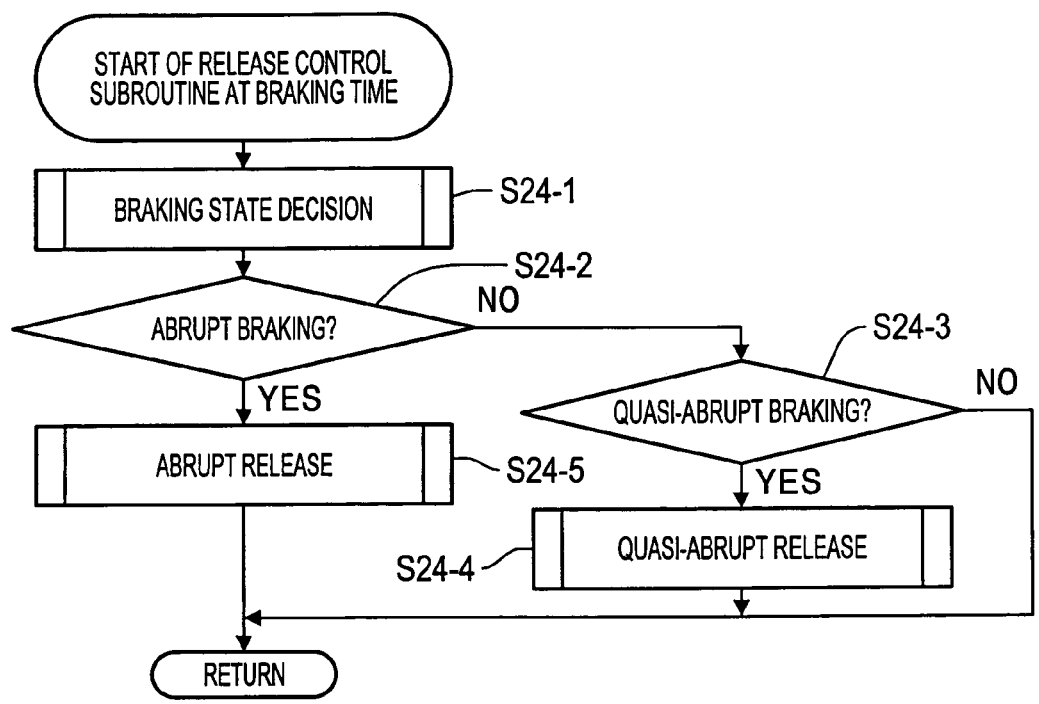
FIG. 26 is a diagram showing a subroutine of a release control at a braking time in the first embodiment of the invention.
Figure 27:
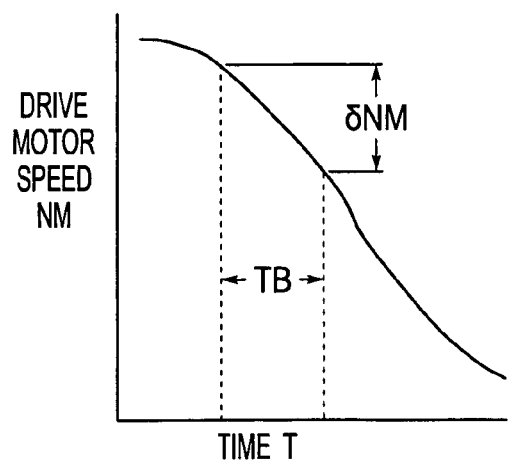
FIG. 27 is a diagram showing a braking state decision map in the first embodiment of the invention.

FIG. 26 is a diagram showing the subroutine of the braking time release control in the first embodiment of the invention, and FIG. 27 is a diagram showing a braking state decision map in the first embodiment of the invention. In FIG. 27, the time is taken on the abscissa, and the drive motor speed NM is taken on the ordinate.

In this case, the braking time release control means (not-shown) releases the generator brake B in a state set to corresponding to a deceleration, by deciding a braking state according to the depressed state of the brake pedal 61 (FIG. 7) by the driver and by determining whether the generator brake B is to be released, according to the decision result. In this exemplary embodiment, the generator brake B is released with the release time set to correspond to the deceleration.

For this release, the braking state decision means 91 (FIG. 1) of the braking time release control means performs the braking state decision to decide the braking state by reading the drive motor speed NM, by calculating the deceleration at the time when the driver depresses the brake pedal 61, as shown in FIG. 27, that is, a variation δNM of the drive motor speed NM for a predetermined time TB (e.g., 8 [ms]) in this embodiment, and by comparing the variation δNM and first and second preset threshold values ΔNMth1 and ΔNMth2 (<ΔNMth1).

Specifically: it is decided that an abrupt braking has been performed, if that variation δNM has the following relation:

$$\delta NM \geq \Delta NMth1;$$

it is decided that a quasi-abrupt braking has been performed, if the variation δNM has the following relations:

$$\Delta NMth1 > \delta NM \geq \Delta NMth2; \text{ and}$$

it is decided that an ordinary braking has been performed, if the variation δNM has the following relation:

$$\Delta NMth2 > \delta NM.$$

In the ordinary braking case, the braking time release control means ends its control and leaves the generator brake B not released but applied. When the application condition is not satisfied in the application condition decision, moreover, the braking time release control means performs the generator brake release control by selecting the ordinary generator brake release control.

In the abrupt braking case, on the other hand, the baking time release control means selects the different releases set for the deceleration, i.e., the quasi-abrupt release and the abrupt release in this embodiment, and releases the generator brake B in accordance with the release schedules set different. In the quasi-abrupt braking case, the quasi-abrupt release means of the braking time release control means performs the quasi-abrupt release to release the generator brake B abruptly. In the abrupt braking case, the abrupt release means of the braking time release control means performs the abrupt release to release the generator brake B extremely abruptly. In this case, the quasi-abrupt release means and the abrupt release means construct the release control means 92.

In this embodiment, the variation δNM of the drive motor speed NM for the predetermined time TB is calculated as the deceleration. As this deceleration, however, it is possible to calculate the variation δNE of the engine speed NE for the predetermined time, the variation δθG of the generator rotor position θG for the predetermined time, the variation δθM of the drive motor rotor position θM for the predetermined time, for example. Moreover, a speed sensor may be arranged as the speed detector in a manner to confront the rotary portion from the engine 11 to the drive wheel 37, so that the variation of the speed detected for the predetermined time by the speed sensor can be calculated. By detecting the brake pedal position BP and by differentiating the brake pedal position BP, moreover, the depression rate of the brake pedal 61 can also be calculated as the deceleration, and the variation of the sensor output of the brake sensor to be used in the ABS (Anti-lock Brake System) can also be calculated as the deceleration.

Next, the flow chart of FIG. 26 will be described in the following.

Step S24-1: The braking state decision is performed.

Step S24-2: It is judged whether the abrupt braking has been performed. The routine advances to Step S24-5, in case the abrupt braking is performed, but otherwise to Step S24-3.

Step S24-3: It is judged whether the quasi-abrupt braking has been performed. The routine advances to Step S24-4, in case the quasi-abrupt is performed, but otherwise returns.

Step S24-4: The quasi-abrupt release is performed to return the routine.

Step S24-5: The abrupt release is performed to return the routine.

Next, the subroutines of the quasi-abrupt release at Step S24-4 of FIG. 26 and the abrupt release at Step S24-5 of FIG. 26 will be described in the following.

Figures 28, 29:
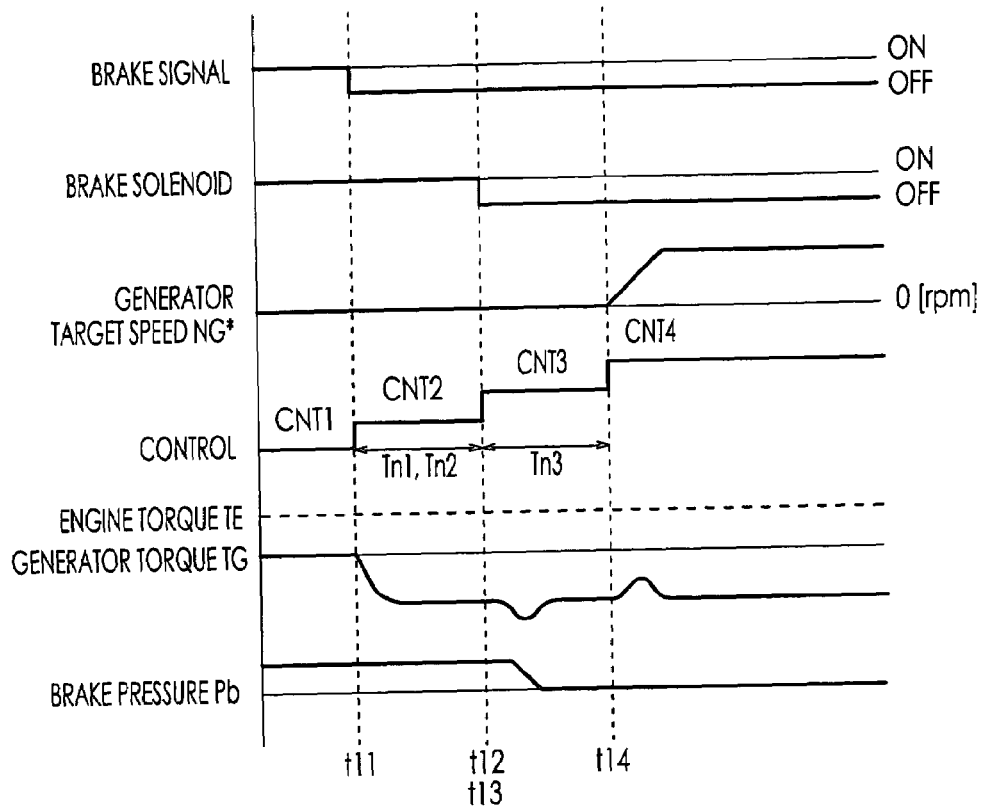
FIG. 28 is a time chart showing the actions of an ordinary generator brake release control in the first embodiment of the invention.
FIG. 29 is a diagram showing a release schedule map in the first embodiment of the invention.
Figure 30:
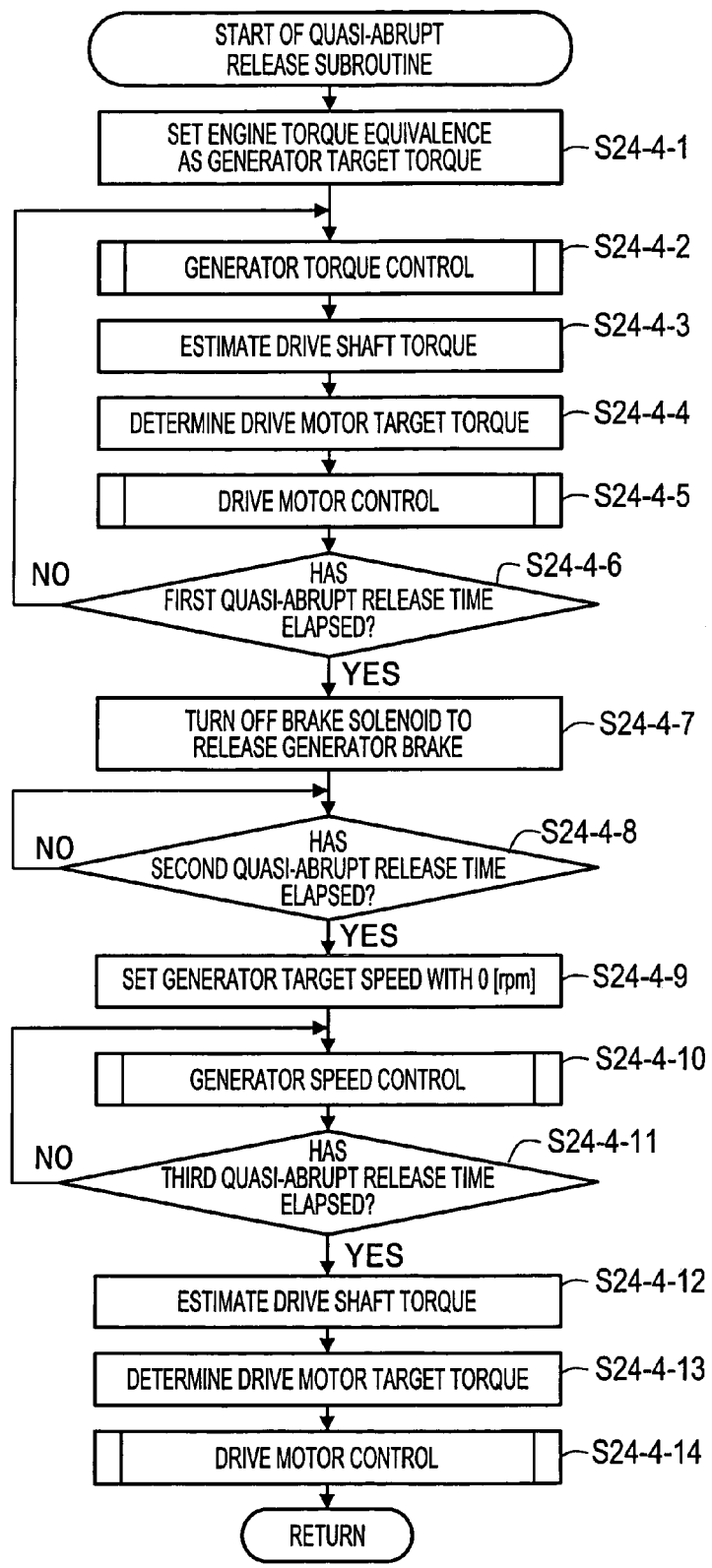
FIG. 30 is a diagram showing a subroutine of a quasi-abrupt release in the first embodiment of the invention.
Figure 31:
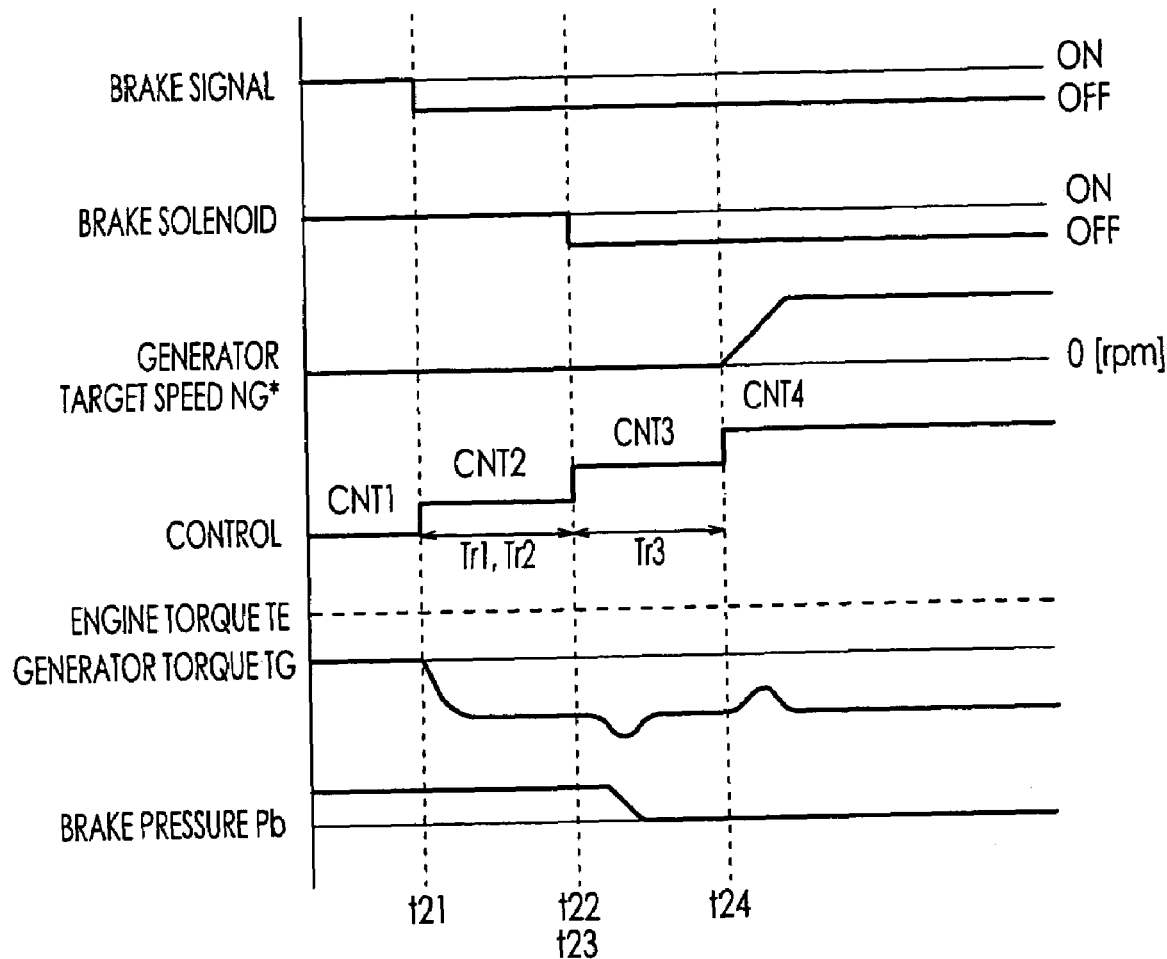
FIG. 31 is a time chart showing the actions of a quasi-abrupt release in the first embodiment of the invention.
Figure 32:
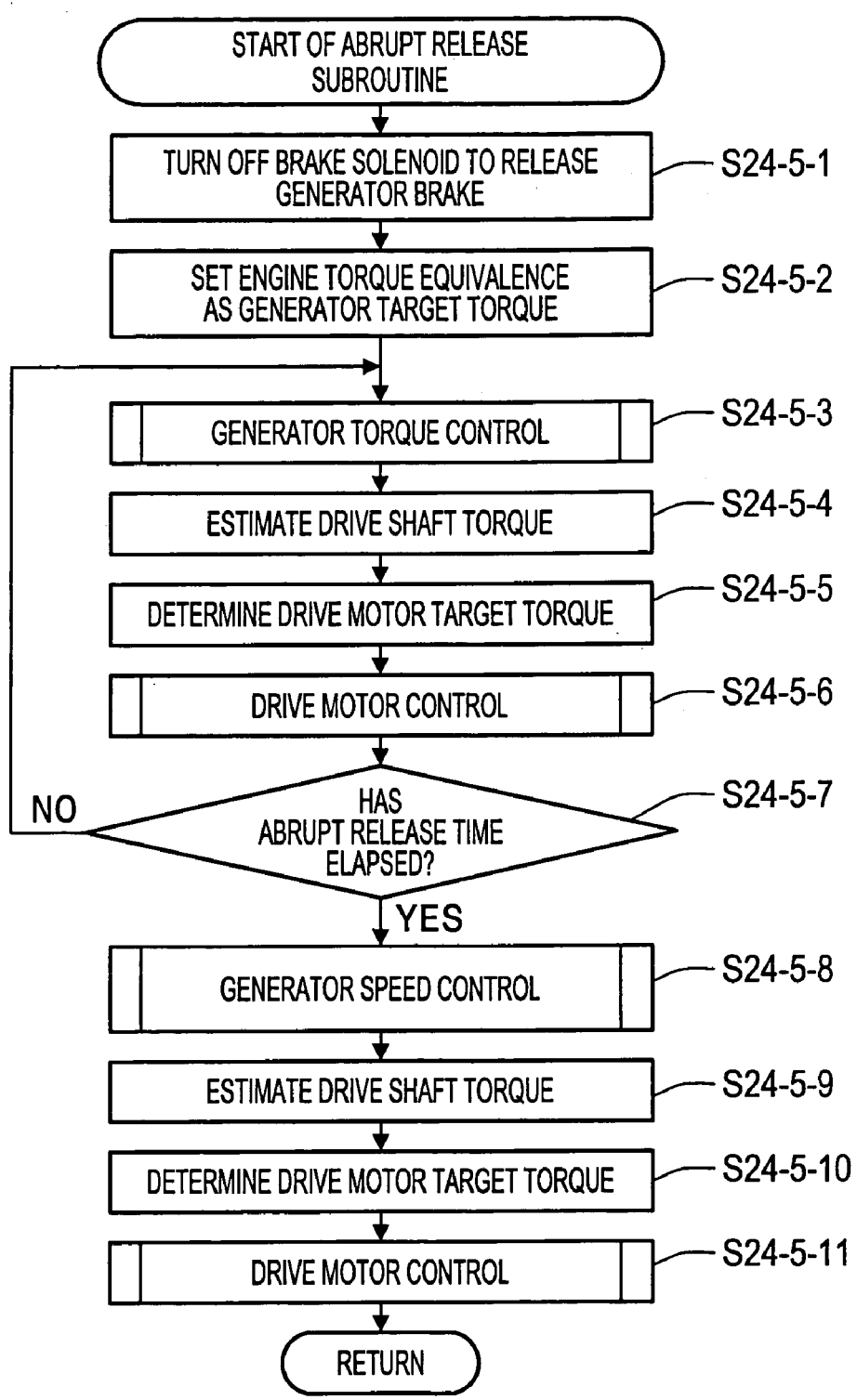
FIG. 32 is a diagram showing a subroutine of an abrupt release in the first embodiment of the invention.
Figure 33:
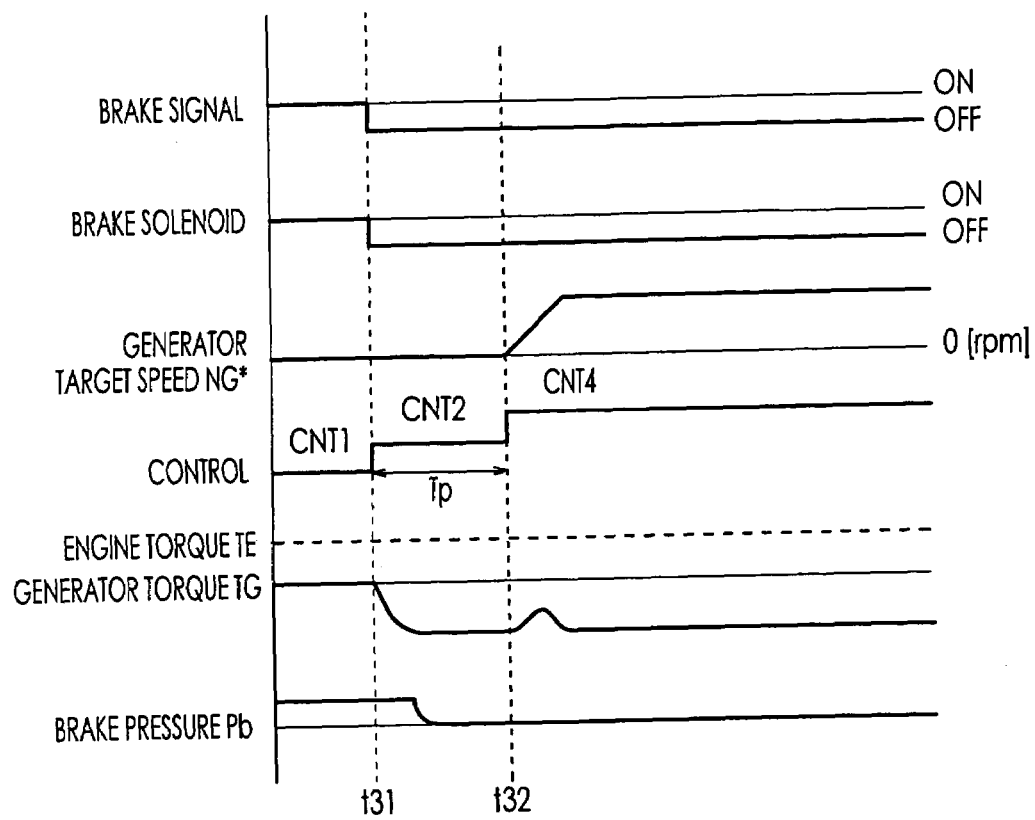
FIG. 33 is a time chart showing the actions of an abrupt release in the first embodiment of the invention.
Figure 34:
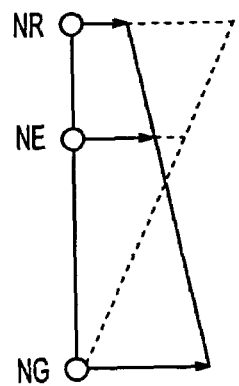
FIG. 34 is a velocity diagram of a quasi-abrupt release and an abrupt release in the first embodiment of the invention when a generator brake is released.
Figure 35:
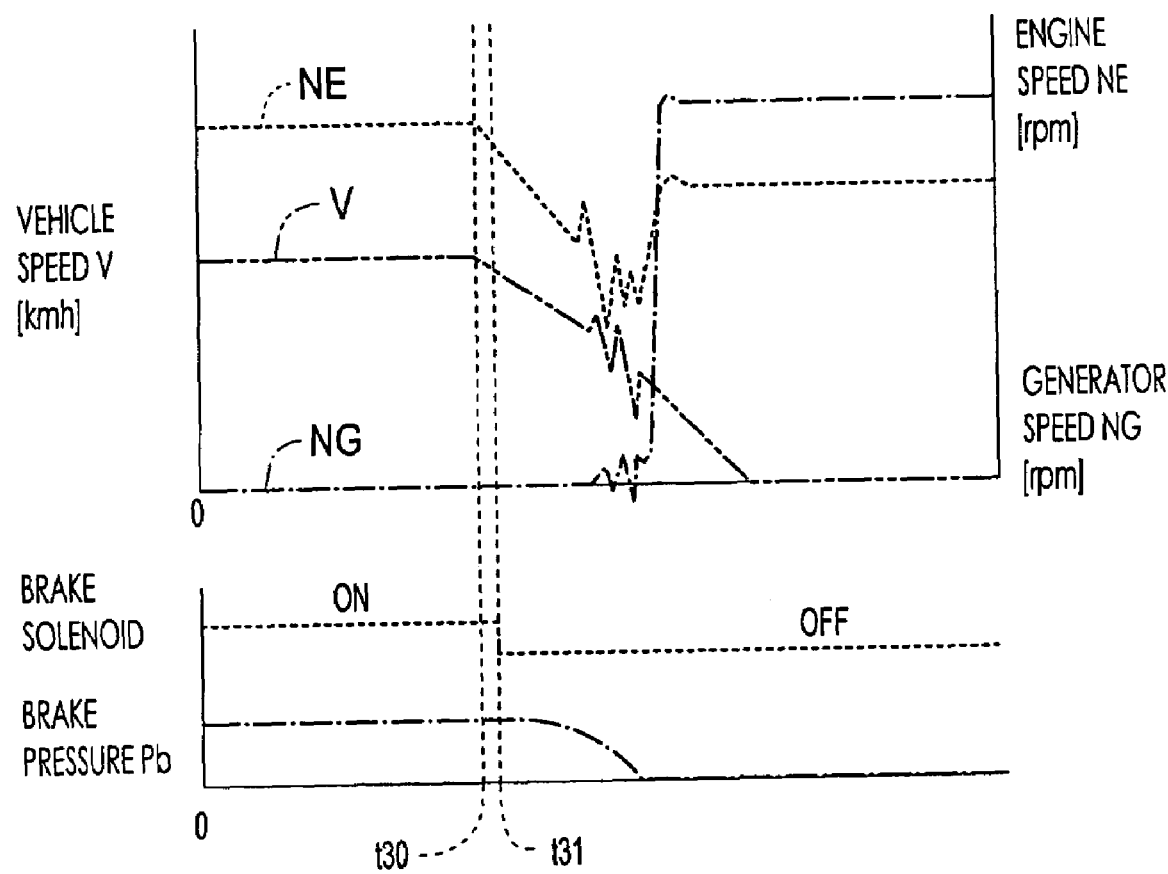
FIG. 35 is a time chart showing the actions of the hybrid type vehicle drive apparatus of an abrupt release in the first embodiment of the invention when the generator brake is released.

FIG. 28 is a time chart showing the actions of an ordinary generator brake release control in the first embodiment of the invention; FIG. 29 is a diagram showing a release schedule map in the first embodiment of the invention; FIG. 30 is a diagram showing a subroutine of a quasi-abrupt release in the first embodiment of the invention; FIG. 31 is a time chart showing the actions of a quasi-abrupt release in the first embodiment of the invention; FIG. 32 is a diagram showing a subroutine of an abrupt release in the first embodiment of the invention; FIG. 33 is a time chart showing the actions of an abrupt release in the first embodiment of the invention; FIG. 34 is a velocity diagram of a quasi-abrupt release and an abrupt release in the first embodiment of the invention when a generator brake is released; and FIG. 35 is a time chart showing the actions of the hybrid type vehicle drive apparatus of an abrupt release in the first embodiment of the invention when the generator brake is released.

At first, the actions of the ordinary generator brake release control will be described with reference to FIG. 28. In this case, the generator brake release control will be described as the ordinary release against the quasi-abrupt release and the abrupt release, and the generator brake release control means will be described as the ordinary release means against the quasi-abrupt release means and the abrupt release means.

When the brake signal is turned OFF at a time t11 while a shut-down control (CNT1) is being performed in the ordinary release, as has been described hereinbefore, the engine controller 46 (FIG. 7) estimates or calculates the engine torque TE to be transmitted to the rotor 21. The buckling torque control means of the ordinary release means performs the buckling torque control to set the engine torque correspondence as the generator target torque TG* by reading the engine torque correspondence. The buckling torque control means performs the buckling torque control (CNT2) to generate the predetermined generator torque TG by the generator torque control of FIG. 19. After this, the drive motor controller 49 performs the drive motor control by estimating the drive shaft torque TR/OUT and determining the drive motor target torque TM*, as performed at Steps S27 to S29.

Next, the ordinary release means reads a first release time Tn1 corresponding to the oil temperature tmB with reference to the release schedule map of FIG. 29. When the first release time Tn1 elapses from the time t11, the release means of the ordinary release means releases the generator brake B by turning OFF the brake solenoid at a time t12 and draining the brake pressure Pb from the hydraulic servo. Moreover, the zero rotation control means of the ordinary release means performs the zero rotation control and reads a second release time Tn2 corresponding to the oil temperature tmB with reference to the release schedule map. When the second release time Tn2 elapses from the time t11, the zero rotation control means performs a zero rotation control (CNT3) with the generator speed control of FIG. 21 by setting the generator target speed NG* with zero [rpm] at a time t13 (although conveniently set identical to the time t12 in this embodiment).

Moreover, the ordinary release means reads in a third release time Tn3 corresponding to the oil temperature tmB with reference to the release schedule map. When the third release time Tn3 elapses from the time t13, the ordinary release means starts a speed control (CNT4) at a time t14 with the generator speed control of FIG. 21, and performs the drive motor control by estimating the drive shaft torque TRIOUT and determining the drive motor target torque TM*, as performed at Steps S27 to S29. Here, the individual times for the oil temperature tmB (not-shown) in FIG. 29 are determined by the linear interpolations.

In the ordinary release of this case, the generator brake B is released after the generator 16 received the engine torque TE by the buckling torque control. Even if the generator brake B is abruptly released, therefore, the generator 16 has already received the engine torque TE so that the engine 11 can be prevented from racing. As a result, the drive feeling of the hybrid type vehicle can be prevented from becoming worse.

Here, the generator brake B is released by lowering the brake pressure Pb so that its release is slower for the lower oil temperature tmB and the quicker for the higher oil temperature tmB. As shown in the release schedule map, therefore, the third release time Tn3 corresponding to the oil temperature tmB is longer for the lower oil temperature tmB and shorter for the higher oil temperature tmB. Therefore, the speed control can be started after the generator brake B was reliably released, thereby to prevent the durability of the frictional member of the generator brake B from being degraded.

The actions of the quasi-abrupt release means will be described with reference to FIGS. 30 and 31.

In the generator brake application control of this case, when the brake signal is turned OFF at a time t21 while a shut-down control (CNT1) is being performed, like the ordinary release, the engine controller 46 (FIG. 7) estimates or calculates the engine torque TE to be transmitted to the rotor 21. The buckling torque control means of the quasi-abrupt release means performs the buckling torque control to set the engine torque correspondence as the generator target torque TG* by reading the engine torque correspondence. The buckling torque control means performs the buckling torque control (CNT2) to generate the predetermined generator torque TG by the generator torque control of FIG. 19. After this, the drive motor controller 49 performs the drive motor control by estimating the drive shaft torque TR/OUT and determining the drive motor target torque TM*, as performed at Steps S27 to S29.

Next, the quasi-abrupt release means reads a first quasi-abrupt release time Tr1 corresponding to the oil temperature tmB with reference to the release schedule map. When the first quasi-abrupt release time Tr1 elapses from the time t21, the release means of the generator brake release means releases the generator brake B by turning OFF the brake solenoid at a time t22. Subsequently, the zero rotation control means of the quasi-abrupt release means performs the zero rotation control and reads a second quasi-abrupt release time Tr2 corresponding to the oil temperature tmB with reference to the release schedule map. When the second quasi-abrupt release time Tr2 elapses from the time t21, the quasi-abrupt release means performs a zero rotation control (CNT3) with the generator speed control of FIG. 21 by setting the generator target speed NG* with zero [rpm] at a time t23 (although conveniently set identical to the time t22 in this embodiment).

Moreover, the quasi-abrupt release means reads in a third quasi-abrupt release time Tr3 corresponding to the oil temperature tmB with reference to the release schedule map. When the third quasi-abrupt release time Tr3 elapses from the time t23, the quasi-abrupt release means starts a speed control (CNT4) at a time t24 with the generator speed control of FIG. 21, and performs the drive motor control by estimating the drive shaft torque TR/OUT and determining the drive motor target torque TM*, as performed at Steps S27 to S29. Here, the first to third quasi-abrupt release times Tr1 to Tr3 construct the release time in the quasi-abrupt release.

Thus, when the driver depresses the brake pedal 61 quickly while the hybrid vehicle is being driven with the generator brake B being applied, the generator brake B can be quickly released.

In this case, as the vehicle speed V abruptly lowers, the ring gear speed NR lowers, and the speed of the carrier CR accordingly lowers, as shown in FIG. 34. As the generator brake B is released, however, the generator speed NG is quickly raised so that the torque to stop the engine 11 is not applied to the carrier CR. Therefore, the engine speed NE can be prevented from lowering thereby to prevent the engine 11 from being stalled.

As a result, it is possible not only to prevent the engine speed NE from seriously fluctuating, but also to prevent the engine torque TE to be transmitted to the planetary gear unit 13 from seriously fluctuating. Therefore, the transmission of vibrations to the engine 11, the planetary gear unit 13 and the like can be suppressed to improve the durability of the hybrid type vehicle drive apparatus.

Moreover, the first to third quasi-abrupt release times Tr1 to Tr3 are set shorter than the first to third release times Tn1 to Tn3 in the ordinary release so that the generator brake B can be quickly released. It is, therefore, possible to surely prevent the engine 11 reliably from being stalled.

In the release schedule map of FIG. 29, the first to third quasi-abrupt release times Tr1 to Tr3 at the individual oil temperatures tmB are set to take equal values. However, the first to third quasi-abrupt release times Tr1 to Tr3 could also be set shorter for the higher oil temperature tmB, and the first to third quasi-abrupt release times Tr1 to Tr3 could also be set longer for the lower oil temperature tmB.

Next, the flow chart of FIG. 30 will be described in the following:

Step S24-4-1: The engine torque correspondence is set as the generator target torque TG*.

Step S24-4-2: The generator torque control is performed.

Step S24-4-3: The drive shaft torque TR/OUT is estimated.

Step S24-4-4: The drive motor target torque TM* is determined.

Step S24-4-5: The drive motor control is performed.

Step S24-4-6: It is judged whether the first quasi-abrupt release time Tr1 has elapsed. The routine advances to Step S24-4-7, in case the first quasi-abrupt release time Tr1 has elapsed, but otherwise returns to Step S24-4-2.

Step S24-4-7: The brake solenoid is turned OFF to release the generator brake B.

Step S24-4-8: The lapse of the second quasi-abrupt release time Tr2 is awaited, and the routine advances to Step S24-4-9 after the lapse.

Step S24-4-9: The generator target speed NG* is set to zero [rpm].

Step S24-4-10: The generator speed control is performed.

Step S24-4-11: It is judged whether the third quasi-abrupt release time Tr3 has elapsed. The routine advances to Step S24-4-12, in case the third quasi-abrupt release time Tr3 has elapsed, but otherwise returns to Step S24-4-10.

Step S24-4-12: The drive shaft torque TR/OUT is estimated.

Step S24-4-13: The drive motor target torque TM* is determined.

Step S24-4-14: The drive motor control is performed to return the routine.

The actions of the abrupt release means will be described with reference to FIGS. 32, 33 and 35.

In the generator brake application control of this case, when the driver depresses the brake pedal 61 quickly at a time t30 for a quick braking while a shut-down control (CNT1) is being performed, the brake signal is turned OFF at a time t31. Then, the quick release means judges the brake-OFF at the time t31, and turns OFF the brake solenoid to release the generator brake B. Moreover, the engine controller 46 estimates or calculates the engine torque TE to be transmitted to the rotor 21. The buckling torque control means of the abrupt release means performs the buckling torque control to set the engine torque correspondence as the generator target torque TG* by reading the engine torque correspondence. The buckling torque control means performs the buckling torque control (CNT2) to generate the predetermined generator torque TG by the generator torque control of FIG. 19. After this, the drive motor controller 49 performs the drive motor control by estimating the drive shaft torque TR/OUT and determining the drive motor target torque TM*, as performed at Steps S27 to S29.

Next, the abrupt release means reads in an abrupt release time Tp corresponding to the oil temperature tmB with reference to the release schedule map. When the abrupt release time Tp elapses from the time t31, the speed control (CNT4) is started by the generator speed control of FIG. 21 at a time t32 (although set at a position other than that of the time t32 in this embodiment). The drive motor control is performed by estimating the drive shaft torque TR/OUT and determining the drive motor target torque TM*, as performed at Steps S27 to S29. In this embodiment, the abrupt release time Tp is set at zero, so that not the buckling torque but the speed control is started in this case. Here, the abrupt release time Tp constructs the release time in the abrupt release.

Thus, in the abrupt release, when the brake signal is turned OFF at the time t31, the abrupt release means turns OFF the brake solenoid so that the it can release the generator brake B extremely abruptly.

Moreover, the abrupt release time Tp is extremely short such as zero [ms] in this exemplary embodiment. Simultaneously as the generator brake B is released at the time t31, the speed control is started at the time t32 so that the generator speed NG can be raised extremely abruptly.

When the driver depresses the brake pedal 61 abruptly at the time t30, as shown in FIG. 35, the engine speed NE and the vehicle speed V lower abruptly. At the time t31, however, the brake signal is turned OFF, and the brake-OFF is judged so that the brake solenoid is turned from ON to OFF.

As the ring gear speed NR lowers, the speed of the carrier CR accordingly lowers. In accordance with the extremely abrupt release of the generator brake B, the generator speed NG rises extremely abruptly so that the torque to stop the engine 11 is not applied to the carrier CR. Therefore, the engine speed NE can be prevented from lowering thereby to prevent the engine 11 from being stalled.

Therefore, the transmission of vibrations to the engine 11, the planetary gear unit 13 and so on can be further suppressed to improve the durability of the hybrid type vehicle drive apparatus far better.

Moreover, the abrupt release time Tp is set far shorter than the first to third quasi-abrupt release times Tr1 to Tr3 in the quasi-abrupt release so that the generator brake B can be more quickly released than the quasi-abrupt release. It is, therefore, possible to further prevent the engine 11 reliably from being stalled.

In the release schedule map, the abrupt release time Tp at the individual oil temperatures tmB is set to zero but could also be set to take a predetermined value. Moreover, the abrupt release time Tp could also be set shorter for the higher oil temperature tmB and longer for the lower oil temperature tmB.

Next, the flow chart of FIG. 32 will be described in the following:

Step S24-5-1: The brake solenoid is turned OFF to release the generator brake B.

Step S24-5-2: The engine torque correspondence is set as the generator target torque TG*.

Step S24-5-3: The generator torque control is performed.

Step S24-5-4: The drive shaft torque TR/OUT is estimated.

Step S24-5-5: The drive motor target torque TM* is determined.

Step S24-5-6: The drive motor control is performed.

Step S24-5-7: It is judged whether the abrupt release time Tp has elapsed. The routine advances to Step S24-5-8, in case the abrupt release time Tp has elapsed, but otherwise returns to Step S24-5-3.

Step S24-5-8: The generator speed control is performed.

Step S24-5-9: The drive shaft torque TR/OUT is estimated.

Step S24-5-10: The drive motor target torque TM* is determined.

Step S24-5-11: The drive motor control is performed to return the routine.

In the first embodiment, the engine 11 is prevented from being stalled, when the vehicle speed V abruptly lowers as the driver depresses the brake pedal 61 abruptly. In case the vehicle speed V is high, it does not abruptly lower even if the driver depresses the brake pedal 61 abruptly.

Here will be described a second exemplary embodiment of the invention, in which the abrupt release or the quasi-abrupt release is prevented from being frequently performed in case the vehicle speed V is high.

Figure 36:
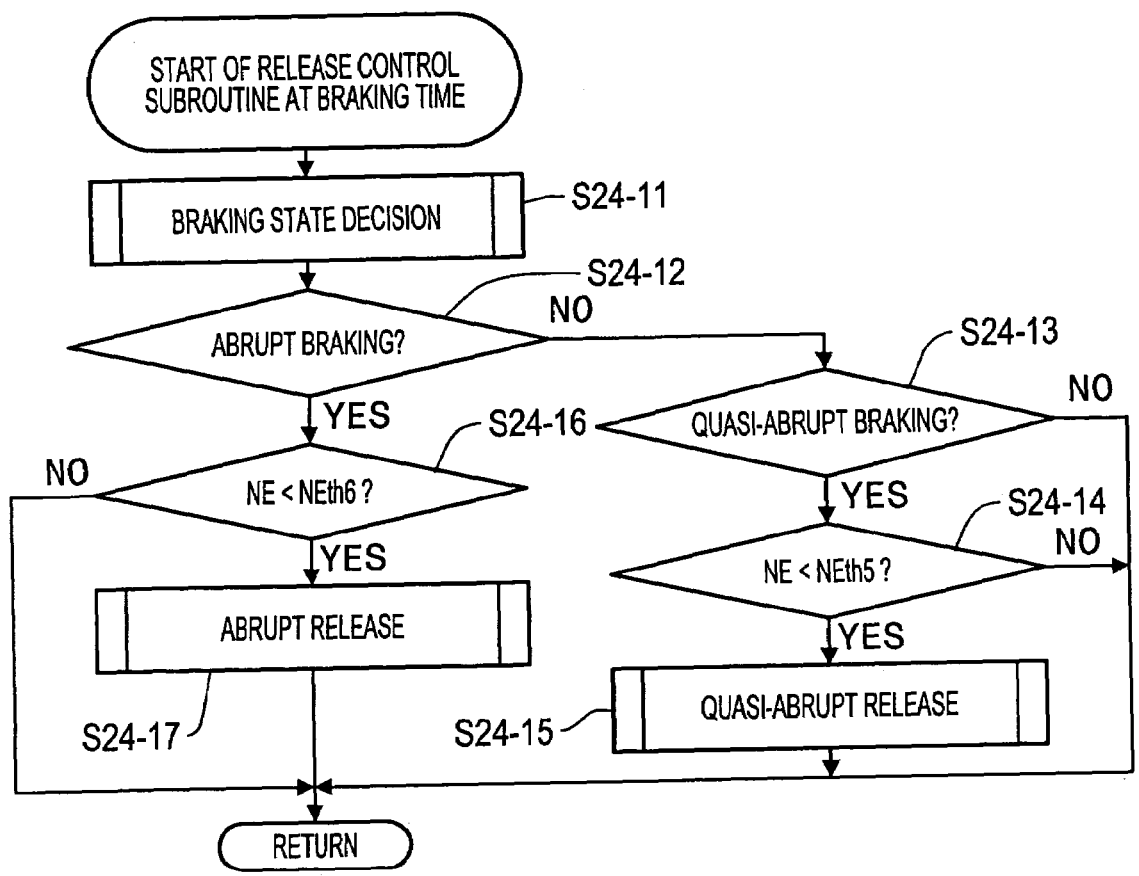
FIG. 36 is a diagram showing a subroutine of a release control at the braking time in a second exemplary embodiment of the invention.

FIG. 36 is a diagram showing the braking time release control subroutine in a second embodiment of the invention, and FIG. 37 is a diagram showing a release control limit map in the second embodiment of the invention. At first, the braking time release control means reads in the oil temperature tmB, the drive motor speed NM and the engine speed NE. The braking state decision means 91 (FIG. 1) of the braking time release control means performs the braking state decision to decide the braking state, as in the first exemplary embodiment, on the basis of the drive motor speed NM. In the ordinary braking case, moreover, the braking time release control means ends its control.

In the quasi-abrupt braking case, on the other hand, the braking time release control means judges whether the engine speed NE is lower than a threshold value NEth5 in the quasi-abrupt release corresponding to the drive motor speed NM indicating the vehicle speed V and the oil temperature tmB, by reading the threshold value NEth5.

In case the engine speed NE is lower than the threshold value NEth5, the quasi-abrupt release means performs the quasi-abrupt release to release the generator brake B as the generator fixing mechanism abruptly. In case the engine speed NE is at the threshold value NEth5 or higher, the vehicle speed V does not lower abruptly so that the driver feels no fear of the stall of the engine 11, even if the driver depresses the brake pedal 61 quickly. Therefore, the release control limit means of the braking time release control means performs the release control limit to limit the quasi-abrupt release.

In the abrupt braking case, on the other hand, the braking time release control means judges whether the engine speed NE is lower than a threshold value NEth6 in the abrupt release corresponding to the drive motor speed NM and the oil temperature tmB, by reading the threshold value NEth6 with reference to the release control limit map.

In case the engine speed NE is lower than the threshold value NEth6, the abrupt release means of the braking time release control means performs the abrupt release to release the generator brake B extremely abruptly. In case the engine speed NE is at the threshold value NEth6 or higher, the vehicle speed V does not lower abruptly so that the driver feels no fear of the stall of the engine 11, even if the driver depresses the brake pedal 61 quickly. Therefore, the release control limit means limits the abrupt release.

In the release control limit map, the threshold values NEth5 and NEth6 change as the oil temperature tmB changes and as the drive motor speed NM changes. Specifically, the higher oil temperature tmB, the larger the threshold values NEth5 and NEth6 become to make the quasi-abrupt release and the abrupt release easy to perform. The lower oil temperature tmB, the smaller the threshold values NEth5 and NEth6 become to make the quasi-abrupt release and the abrupt release hard to perform. The higher drive motor speed NM and the higher vehicle speed V, moreover, the larger the threshold values NEth5 and NEth6 become to make the quasi-abrupt release and the abrupt release easy to perform. The lower oil temperature tmB, the smaller the threshold values NEth5 and NEth6 become to make the quasi-abrupt release and the abrupt release hard to perform. In this embodiment, the drive motor speed NM is used as the parameter indicating the vehicle speed V in the release control limit map, but the vehicle speed V itself could also be used in place of the drive motor speed NM. Moreover, the individual threshold values NEth5 and NEth6 for the oil temperature tmB and the drive motor speed NM, although not shown, can be obtained by the linear interpolations.

Next, the flow chart of FIG. 36 will be described in the following:

Step S24-11: The braking state decision is performed.

Step S24-12: It is judged whether the abrupt braking has been performed. The routine advances to Step S24-16, in case the abrupt braking is performed, but otherwise to Step S24-13.

Step S24-13: It is judged whether the quasi-abrupt braking has been performed. The routine advances to Step S24-14, in case the quasi-abrupt is performed, but otherwise returns.

Step S24-14: It is judged whether the engine speed NE is lower than the threshold value NEth5. The routine advances to Step S24-14, in case the engine speed NE is lower than the threshold value NEth5, but is returned in case the engine speed NE is at the threshold value NEth5 or higher.

Step S24-15: The quasi-abrupt release is performed to return the routine.

Step S24-16: It is judged whether the engine speed NE is lower than the threshold value NEth6. The routine advances to Step S24-17, in case the engine speed NE is lower than the threshold value NEth6, but is returned in case the engine speed NE is at the threshold value NEth6 or higher.

Step S24-17: The abrupt release is performed to return the routine.

The present invention is not limited to these exemplary embodiments but could also be modified in various manners, which should not be excluded from the scope thereof.

According to the embodiment of the invention, as has been described in detail, there is provided a hybrid type vehicle drive control device comprising: a generator connected differentially rotatably and mechanically to an engine; a generator fixing mechanism for stopping the rotation of the generator mechanically; braking state decision means for deciding a braking state by a braking brake; and release control means for releasing the generator fixing mechanism when it is decided that an abrupt braking has been performed.

When the abrupt braking is performed in this case, the generator fixing mechanism is released. As a result, it is possible to prevent the engine speed from lowering and the engine from being stalled.

In still another embodiment of a hybrid type vehicle drive control device according to the invention, the release control means releases the generator fixing mechanism after the start of a buckling torque control using an engine torque correspondence as a generator target torque.

In this case, the buckling torque control is started, and the generator fixing mechanism is then released. Even if the engine torque is transmitted to the generator as the generator fixing mechanism is released, neither the generator torque nor the engine torque is seriously changed so that the shocks can be prevented from occurring.

In still another embodiment of a hybrid type vehicle drive control device according to the invention, in the quasi-abrupt release, the release time from the start of the buckling torque control to the start of the zero rotation control and the release time from the start to the end of the zero rotation control are set shorter than the individual release times in an ordinary release.

In this case, the release time from the start of the buckling torque control to the start of the zero rotation control and the release time from the start to the end of the zero rotation control are set shorter than the individual release times in the ordinary release, so that the generator fixing mechanism can be abruptly released when the abrupt braking is performed. As a result, it is possible to surely prevent the engine reliably from being stalled.

In still another embodiment of a hybrid type vehicle drive control device according to the invention, the release time from the start to the end of the buckling torque control is set shorter than the individual release times in a quasi-abrupt release.

In this case, the release time from the start to the end of the buckling torque control is set shorter than the individual release times in the quasi-abrupt release, so that the generator fixing mechanism can be released remarkably quickly when the abrupt braking is performed. As a result, it is possible to prevent the engine more reliably from being stalled.

What is claimed is:

1. A hybrid type vehicle drive control device, comprising:
   a generator connected differentially rotatably and mechanically to an engine;
   a generator fixing mechanism for stopping the rotation of said generator mechanically;
   braking state decision means for deciding a braking state by a braking brake; and
   release control means for releasing said generator fixing mechanism when it is decided that an abrupt braking has been performed.

2. A hybrid type vehicle drive control device according to claim 1, wherein said release control means releases said generator fixing mechanism after the start of a buckling torque control using an engine torque correspondence as a generator target torque.

3. A hybrid type vehicle drive control device according to claim 1, wherein said release control means performs a zero rotation control by setting a generator target speed to zero in accordance with the release of said generator fixing mechanism.

4. A hybrid type vehicle drive control device according to claim 1, wherein an ordinary release means of said release control means performs an ordinary release to perform a buckling torque control using an engine torque correspondence as a generator target torque, then to release said generator fixing mechanism, and to perform a zero rotation control by setting a generator target speed to zero.

5. A hybrid type vehicle drive control device according to claim 4, wherein said ordinary release means performs the zero rotation control and then a generator speed control.

6. A hybrid type vehicle drive control device according to claim 1, wherein a quasi-abrupt release means of said release control means begins a quasi-abrupt release to perform a buckling torque control using an engine torque correspondence as a generator target torque, then to release said generator fixing mechanism, and to perform a zero rotation control by setting a generator target speed to zero.

7. A hybrid type vehicle drive control device according to claim 6, wherein said quasi-abrupt release means performs the zero rotation control and then a generator speed control.

8. A hybrid type vehicle drive control device according to claim 6, wherein in said quasi-abrupt release, a release time from the start of said buckling torque control to the start of the zero rotation control and a release time from the start to the end of said zero rotation control are set shorter than individual release times in an ordinary release.

9. A hybrid type vehicle drive control device according to claim 8, wherein said generator fixing mechanism is activated by an oil pressure, and wherein said individual release times are set to correspond to the oil temperature of said generator fixing mechanism.

10. A hybrid type vehicle drive control device according to claim 1, wherein an abrupt release means of said release control means begins an abrupt release to perform a buckling torque control using an engine torque correspondence as a generator target torque and then to release said generator fixing mechanism.

11. A hybrid type vehicle drive control device according to claim 10, wherein said abrupt release means releases said generator fixing mechanism, and performs a generator speed control.

12. A hybrid type vehicle drive control device according to claim 10, wherein in said abrupt release, a release time from the start to the end of said buckling torque control is set shorter than individual release times in a quasi-abrupt release.

13. A hybrid type vehicle drive control device according to claim 1, wherein the release control means controls releasing said generator fixing mechanism in a mode set to correspond to a deceleration, when it is decided that the abrupt braking has been performed.

14. A hybrid type vehicle drive control device according to claim 13, wherein said release control means performs a release, the schedule of which is set different to correspond to the deceleration.

15. A hybrid type vehicle drive control device according to claim 14, wherein said deceleration is calculated on the basis of a variation of the speed of a predetermined rotary member.

16. A hybrid type vehicle drive control device according to claim 13, wherein said release control means selects at least one of an ordinary release, a quasi-abrupt release and an abrupt release on the basis of the deceleration.

17. A hybrid type vehicle drive control device according to claim 13, wherein said deceleration is calculated on the basis of a variation of the speed of a predetermined rotary member.

18. A hybrid type vehicle drive control device according to claim 13, wherein said release control means releases said generator fixing mechanism after a start of a buckling torque control using an engine torque correspondence as a generator target torque.

19. A hybrid type vehicle drive control device according to claim 13, wherein said release control means performs a zero rotation control by setting a generator target speed to zero in accordance with the release of said generator fixing mechanism.

20. A hybrid type vehicle drive control device according to claim 13, wherein an ordinary release means of said release control means performs an ordinary release to perform a buckling torque control using an engine torque correspondence as a generator target torque, then to release said generator fixing mechanism, and to perform a zero rotation control by setting a generator target speed to zero.

21. A hybrid type vehicle drive control device according to claim 20, wherein said ordinary release means performs the zero rotation control and then a generator speed control.

22. A hybrid type vehicle drive control device according to claim 13, wherein a quasi-abrupt release means of said release control means begins a quasi-abrupt release to perform a buckling torque control using an engine torque correspondence as a generator target torque, then to release said generator fixing mechanism, and to perform a zero rotation control by setting a generator target speed to zero.

23. A hybrid type vehicle drive control device according to claim 22, wherein said quasi-abrupt release means performs the zero rotation control and then a generator speed control.

24. A hybrid type vehicle drive control device according to claim 22, wherein in said quasi-abrupt release, a release time from the start of said buckling torque control to the start of the zero rotation control and a release time from the start to the end of said zero rotation control are set shorter than individual release times in an ordinary release.

25. A hybrid type vehicle drive control device according to claim 24, wherein said generator fixing mechanism is activated by an oil pressure, and wherein said individual release times are set to correspond to the oil temperature of said generator fixing mechanism.

26. A hybrid type vehicle drive control device according to claim 13, wherein an abrupt release means of said release control means begins an abrupt release to perform a buckling torque control using an engine torque correspondence as a generator target torque and then to release said generator fixing mechanism.

27. A hybrid type vehicle drive control device according to claim 26, wherein said abrupt release means releases said generator fixing mechanism, and performs a generator speed control.

28. A hybrid type vehicle drive control device according to claim 15, wherein in an abrupt release, a release time from the start to the end of said buckling torque control is set shorter than individual release times in a quasi-abrupt release.

29. A hybrid type vehicle drive control method, wherein a braking state by a braking brake is decided by mechanically stopping the rotation of a generator connected differentially rotatably and mechanically to an engine, and wherein a generator fixing mechanism is released when it is decided that an abrupt braking has been performed.

30. A hybrid type vehicle drive control method according to claim 29, wherein the generator fixing mechanism is released in a mode set to correspond to a deceleration, when it is decided that the abrupt braking has been performed.

31. A program for a hybrid type vehicle drive control method, wherein a computer functions as a braking state decision means for determining a braking state by a braking brake, and release control means for releasing a generator fixing mechanism when it is decided that an abrupt braking has been performed.

32. A program for a hybrid type vehicle drive control method according to claim 31, wherein the release control means controls releasing the generator fixing mechanism in a mode set to correspond to a deceleration, when it is decided that the abrupt braking has been performed.

33. A hybrid type vehicle drive control device, comprising:
- a generator connected differentially rotatably and mechanically to an engine;
- a generator fixing mechanism for stopping the rotation of said generator mechanically;
- braking state decision unit that decides a braking state by a braking brake; and
- release control unit that controls releasing said generator fixing mechanism when it is decided that an abrupt braking has been performed.

34. A hybrid type vehicle drive control device according to claim 1, wherein the release control unit controls releasing said generator fixing mechanism in a mode set to correspond to a deceleration, when it is decided that the abrupt braking has been performed.

* * * * *